United States Patent
Cho et al.

(10) Patent No.: US 7,050,883 B2
(45) Date of Patent: May 23, 2006

(54) OFF-LINE FEED RATE SCHEDULING FOR REDUCTION OF MACHINING TIME AND ENHANCEMENT OF MACHINING ACCURACY IN CNC MACHINING

(75) Inventors: Dong-Woo Cho, Pohang (KR); Jeong-Hoon Ko, Pohang (KR); Han-Ul Lee, Pohang (KR)

(73) Assignee: POSTECH Foundation, Pohang (KR)

( * ) Notice: Subject to any disclaimer, the term of this patent is extended or adjusted under 35 U.S.C. 154(b) by 0 days.

(21) Appl. No.: 10/790,750

(22) Filed: Mar. 3, 2004

(65) Prior Publication Data

US 2005/0113963 A1    May 26, 2005

(30) Foreign Application Priority Data

Nov. 20, 2003    (KR) .................... 10-2003-0082695

(51) Int. Cl.
*G06F 19/00* (2006.01)
*G06F 17/10* (2006.01)
*G05B 13/02* (2006.01)

(52) U.S. Cl. .................... 700/188; 700/29; 700/46; 700/52; 703/2

(58) Field of Classification Search ............. 700/28, 700/29, 46, 52, 182, 188; 703/1, 2, 6, 7
See application file for complete search history.

(56) References Cited

U.S. PATENT DOCUMENTS

| 4,423,481 | A | * | 12/1983 | Reid-Green et al. ........ 700/189 |
| 4,888,707 | A | * | 12/1989 | Shimada .................... 700/255 |
| 5,876,155 | A | * | 3/1999 | Link et al. .................. 408/1 R |

OTHER PUBLICATIONS

"Modeling the Surface Swept by a Generalized Cutter for NC Verification," by Yun C. Chung et al., *Computer-Aided Design*, vol. 30, No. 8, pp. 587-594, 1998.

* cited by examiner

*Primary Examiner*—Leo Picard
*Assistant Examiner*—Sean Shechtman
(74) *Attorney, Agent, or Firm*—Harness, Dickey & Pierce, P.L.C.

(57) ABSTRACT

An off-line feed rate scheduling method of a CNC machining process includes selecting a constraint variable and inputting a reference value related to the constraint variable; estimating a cutting configuration where a maximum constraint variable value (CVV) occurs through ME Z-map modeling; receiving the estimated cutting configuration and estimating a specific rotation angle ($\phi_s$) where the maximum constraint variable value occurs through constraint variable modeling; calculating a feed rate that satisfies the reference value of the constraint variable at the estimated specific rotation angle; and applying the calculated feed rate to the NC code. Cutting force or machined surface error may be selected as a constraint variable depending on machining conditions.

13 Claims, 23 Drawing Sheets

Rake surface

Cusp height

Cusp height (a) Considered area for edge node
(b) Edge node moving

— Acceleration and Deceleration Characteristic of Multi-block Machining
------ Acceleration and Deceleration Characteristic of Single-block Machining
Tc : Acceleration and Deceleration Time

OFF-LINE FEED RATE SCHEDULING FOR REDUCTION OF MACHINING TIME AND ENHANCEMENT OF MACHINING ACCURACY IN CNC MACHINING

BACKGROUND OF THE INVENTION (a) Field of the Invention

The present invention relates to CNC (computer numerically controlled) machining technology, and more particularly, to off-line feed rate scheduling for reduction of machining time and enhancement of machining accuracy in CNC machining.

(b) Description of the Related Art

Research into metal machining technologies has taken on increasing importance as design and production cycles of a product become shorter in response to changing consumer demand. This is particularly true in the present-day industrial situation where a company's survival is closely linked to its ability to remain economically competitive. Modern production workers perform machining by relying upon empirical machining conditions even after a tool path is generated using CAM (computer aided manufacturing) software. Production workers depend mainly on stable machining conditions such that production time is reduced. Further, in transient cut regions such as a corner section where a tool path is encountered, machined surface errors occur severely because production workers randomly adjust a feed rate in these regions. In addition, many processes are required to remove these machined surface errors generated during NC machining.

These problems may be overcome through the systematic selection of machining conditions. Since a feed rate scheduling system gives a manufacturing machine user optimum machining conditions that take into consideration ease of machining, machining stability, and machined surface errors, it can be a useful tool in many respects (e.g., to reduce production costs and to make more various kinds of small production).

In CNC machining, although the need to optimize feed rate, which is related to productivity improvement, is becoming increasingly important, it has not yet become a common technology that can be used for the manufacture of a wide variety of products. This is a result of the fact that analysis is not definitely performed with respect to the cutting process such that it is difficult to anticipate machining results of various cutting conditions. In order to determine optimum cutting conditions for CNC machining, a process of trial and error is undertaken. Since it is difficult to format this knowledge for input to a database, a new production worker must start anew until he or she becomes familiar with the processes.

CAM software companies are introducing feed rate optimization methods to improve their competitiveness. However, feed rate optimization methods used in most CAM software available today uniformly maintain an MRR (material removal rate) in consideration of a geometric relation between a workpiece and a tool. However, in methods utilizing MRR, it is not possible to put precision adjustment of a cutting force and a cutting force coefficient in database form. Since the intensity of the cutting force may vary greatly according to changes in spindle speed even with the same MRR, such methods result in reducing competitiveness. Accordingly, a feed rate scheduling method that is based on a cutting force model is needed. If accurate, the cutting force model would be able to be effectively applied to feed rate scheduling.

SUMMARY OF THE INVENTION

In one exemplary embodiment of the present invention, there is provided an off-line feed rate scheduling method that improves machining precision and productivity during CNC machining by developing an off-line feed rate scheduling model that optimizes feed rate in CNC machining based on a cutting force model and a surface error model.

In an exemplary embodiment of the present invention, an off-line feed rate scheduling method of a CNC machining process includes selecting a constraint variable and inputting a reference value related to the constraint variable; estimating a cutting configuration where a maximum constraint variable value (CVV) occurs through ME Z-map modeling; receiving the estimated cutting configuration and estimating a specific rotation angle ($\phi_s$) where the maximum constraint variable value occurs through constraint variable modeling; calculating a feed rate that satisfies the reference value of the constraint variable at the estimated specific rotation angle; and applying the calculated feed rate to the NC code.

The cutting force or machined surface error may be selected as the constraint variable depending on machining conditions.

Calculating the feed rate includes inputting specific feed rates $f_1$ and $f_2$ ($f_1 < f_2$); calculating maximum constraint variable values $CVV_1$ and $CVV_2$ corresponding to the feed rates f1 and f2, respectively, at the specific rotation angle; approximating a feed rate $f_{next}$ that corresponds to a reference value RV of a constraint variable value using the formula $$f_{next} = f_1 + \frac{(RV - CVV_1)(f_2 - f_1)}{CVV_2 - CVV_1};$$

calculating a constraint variable $CVV_{next}$ in the case where the feed rate is $f_{next}$; and determining using the formula below if the constraint variable value $CVV_{next}$ when compared to the reference value RV is less than an error limit, applying the feed rate $f_{next}$ to the NC code when it is less than the error limit, replacing the feed rate $f_2$ by $f_{next}$ and repeating the process of obtaining $f_{next}$ when this value is not less than the error limit and the reference value RV is greater than the constraint variable value $CVV_{next}$, and replacing the feed rate $f_1$ by $f_{next}$ and repeating the process of obtaining $f_{next}$ when this value is not less than the error limit and the reference value is not greater than the constraint variable value $CVV_{next}$, where $$\frac{CVV_{next} - RV}{RV} < \text{Error Limit}$$

The computing a cutting configuration through ME Z-map modeling includes searching for node points located in cutting area; identifying whether a target node is the edge node (the node closest to cutter edge) or not; calculating and updating a height value of each node in cutting area; moving a target node if it is an edge node and storing movement direction angles; and computing the cutting configurations using the stored angles.

If a difference between a distance from a tool center to a target node and a tool radius is smaller than a movement limit, this node is designated as an edge node. Also, the cutting configurations computed through ME Z-map modeling include an entry angle, an exit angle, an axial depth of cut, and so on.

BRIEF DESCRIPTION OF THE DRAWINGS

The accompanying drawings, which together with the specification, illustrate exemplary embodiments of the present invention, and, together with the description, serve to explain the principles of the present invention.

DETAILED DESCRIPTION

Exemplary embodiments of the present invention will now be described in detail with reference to the accompanying drawings.

Figure 1:
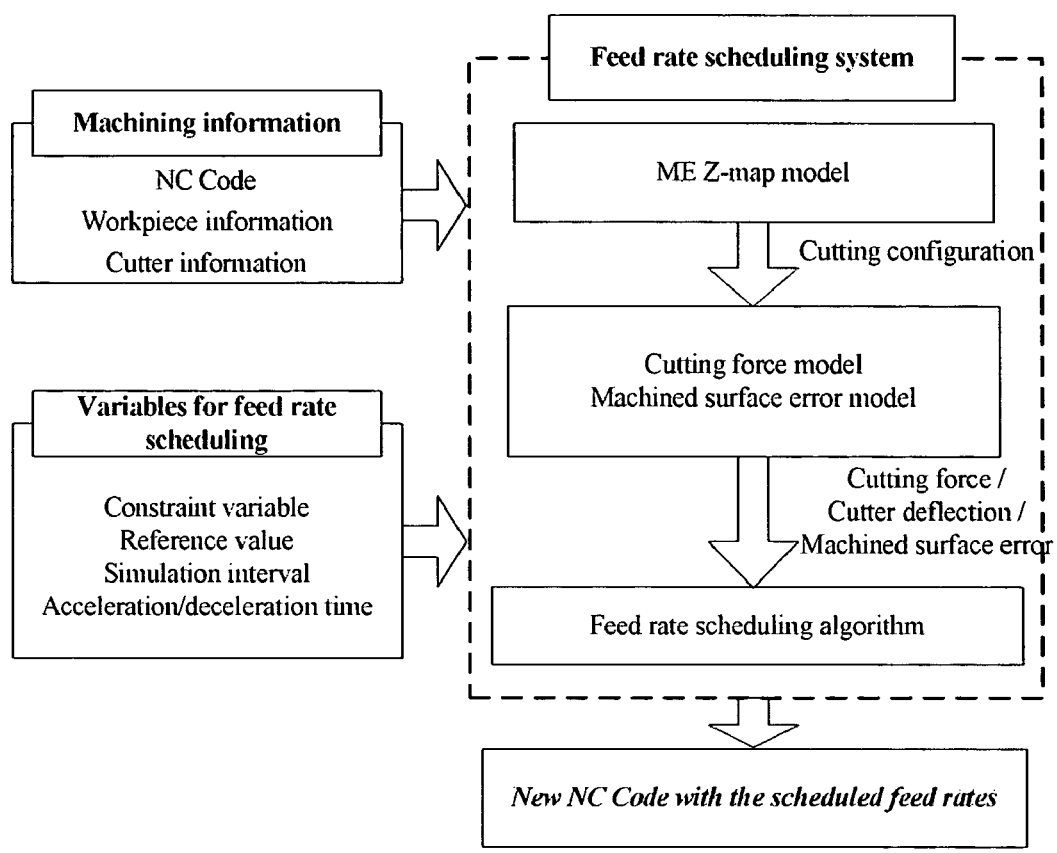
FIG. 1 is a schematic diagram showing a structure of an off-line feed rate scheduling system according to an exemplary embodiment of the present invention.

FIG. 1 is a schematic diagram showing a structure of an off-line feed rate scheduling system according to an exemplary embodiment of the present invention.

An off-line feed rate scheduling system includes a cutting force model, a machined surface error model, an ME (moving edge node) Z-map model, and an optimum feed rate scheduling algorithm.

As shown in FIG. 1, after selection of an NC code, machining information, and variables for feed rate scheduling, that is, constraint variables (cutting force and machined surface errors), feed rate scheduling is performed when a reference value, a simulation interval, and an acceleration/deceleration time are input. In the case where the cutting force is established as the constraint variable, the reference value is automatically calculated without requiring additional input; and in the case where the machined surface error is established as the constraint variable, the user inputs a desired machined permissible error as the reference value.

Further, cutting configurations such as a tool traveling direction, a tool entry/exit angle, an axial depth of cut, etc. are calculated from the ME Z-map and transmitted to the cutting force model and the machined surface error model. Next, cutting force, tool deflection, and machined surface errors are calculated from the cutting force model and the machined surface error model. So that these values satisfy reference values, the feed rate scheduling algorithm is used to find the desired feed rate and provide an optimized feed rate to the NC code.

The method of performing feed rate scheduling varies depending on the constraint variable. In this exemplary embodiment, cutting force or machined surface errors may be selected as the constraint variable. That is, in the case where the user intends to adjust cutting force or machined surface errors, a feed rate scheduling method according to the selection of each constraint variable may be used. The user may select cutting force or machined surface error as the constraint variable according to the step of rough cutting, semi-finish cutting, and finish cutting. Typically, cutting force is selected as the constraint variable in rough cutting and semi-finish cutting, and machined surface error is selected as the constraint variable in finish cutting.

In the following, a method of calculating and obtaining models of each of the cutting force and machined surface error, and of calculating a cutting configuration through the ME Z-map model, is presented. Also, a method is described in which these constraint variable (cutting force and machined surface error) models and the ME Z-map model are used to calculate an optimum feed rate according to allowed reference values.

In the case where cutting force is selected as the constraint variable, a cutting force model is required to estimate the cutting force. In this exemplary embodiment, cutting force models with respect to flat end milling and ball end milling have been calculated.

[Flat End Milling Cutting Force Model]

Figure 2:
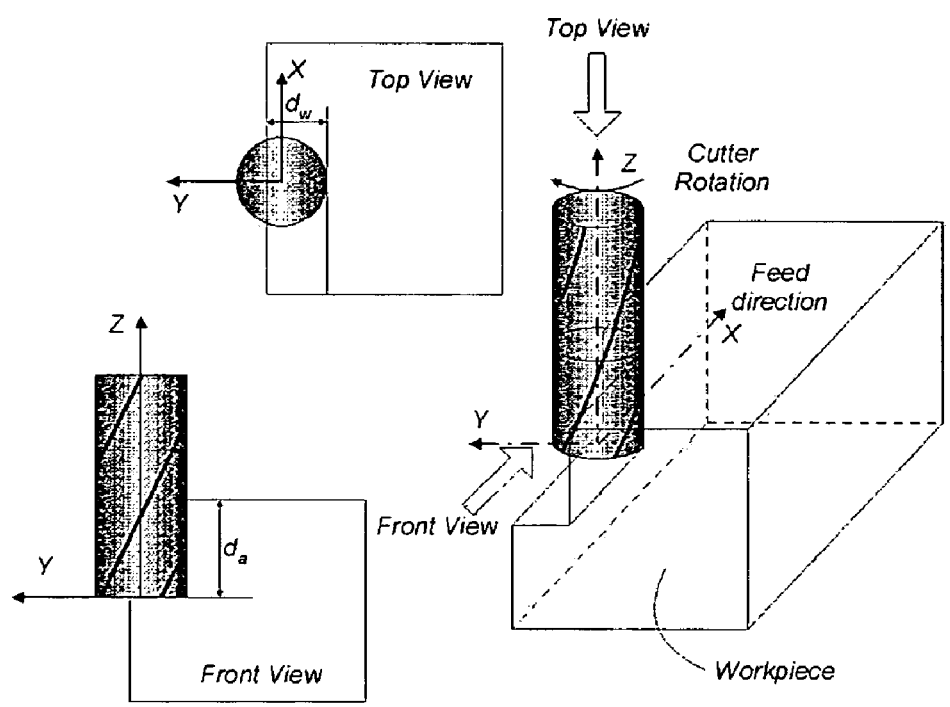
FIG. 2 is a schematic diagram showing the formation of a flat end milling process.
Figure 3:
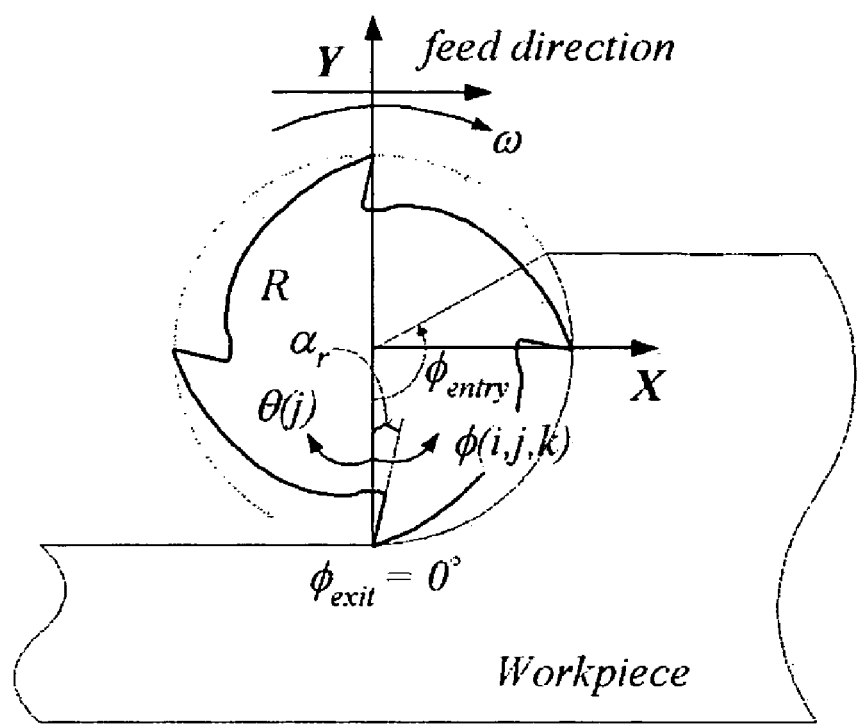
FIG. 3 is a drawing used to show a tool rotational angle and an angle at a position to be cut at a cross section of a flat end milling tool.

FIG. 2 is a schematic diagram showing the geometry and the coordinate system of a flat end milling process, and FIG. 3 is a drawing used to show cutter rotation and cutting edge location angles on a cross section of an end-milling cutter.

The end milling cutter, as usual, is divided into a finite number of disk elements and the total x-, y-, and z-force components acting on a flute at a particular instant are obtained by summing up the force components acting on each individual disk element.

In FIG. 3, each angle position of an i-th tooth and a k-th axial direction disk element in an initial state (when tool rotation is not considered) is obtained using Formula 1.

$$\alpha(i, k) = (i-1)\phi_c + (k\Delta a + \Delta a/2)\frac{\tan\theta_h}{R} \qquad \text{[Formula 1]}$$

where i is a cutter tooth index, k is an index of a z-axis disk element, $\Delta a$ is a height of the z-axis disk element, $\theta_h$ is a helix angle, and R is a radius of the cutter.

In Formula 1, an angle position of a cutter edge is obtained using Formula 2.

$$\phi(i,j,k) = \alpha(i,k) + \theta(j)$$

$$\theta(j) = -j\Delta\theta \qquad \text{[Formula 2]}$$

where j is an index of a cutter rotation angle, $\theta(j)$ is a cutter rotation angle, and $\Delta\theta$ is the amount of increase in the rotation angle.

If the cutting force components on rake surface is divided into a normal pressure force $dF_n(\phi)$ and a frictional force $dF_f(\phi)$, Formulas 3 and 4 are obtained.

$$dF_n(\alpha,\theta) = K_n A(\theta) \vec{n}(\alpha) dA_c \qquad \text{[Formula 3]}$$

$$dF_f(\alpha,\theta) = K_f K_n A(\theta) \vec{T_c}(\alpha) dA_c \qquad \text{[Formula 4]}$$

where $$dA_c = t_c(\phi)\cos\alpha_r\left(\frac{\Delta a}{\cos\theta_h}\right), \text{ and}$$

$$A(\theta) = \begin{vmatrix} \cos\theta & -\sin\theta & 0 \\ \sin\theta & \cos\theta & 0 \\ 0 & 0 & 1 \end{vmatrix} \quad B_1 = \cos\alpha_r\left(\frac{\Delta a}{\cos\theta_h}\right)$$

In the above conditions, $\alpha_r$ is a rake angle and $t_c(\phi)$ is uncut chip thickness, which are calculated considering tool deflection and run out.

If the cutting force is shown in a rectangular coordinate system using the normal pressure force and the frictional force, Formula 5 is obtained.

$$F_x(i,j,k) = [C_1 K_n \cos(\phi-\alpha_r) + K_f K_n C_3 \cos\phi - K_f K_n C_4 \sin(\phi-\alpha_r)]t_c(\phi)B_1$$

$$F_y(i,j,k) = [C_1 K_n \sin(\phi-\alpha_r) + K_f K_n C_3 \sin\phi + K_f K_n C_4 \cos(\phi-\alpha_r)]t_c(\phi)B_1$$

$$F_z(i,j,k) = [-C_2 K_n + K_f K_n C_5]t_c(\phi)B_1 \qquad \text{[Formula 5]}$$

where C1 and C2 are constants, and are calculated by the following:

$$C_1 = \frac{\cos\theta_h}{\sin\theta_{tk}}, \quad C_2 = \frac{\sin\theta_h}{\sin\theta_{tk}} \cdot \cos\alpha_r$$

and C3, C4, and C5 are values determined by chip flow angle $\theta_c$ and is calculated as in the following:

$$C_3 = \sin\theta_h(\sin\theta_c - \cos\theta_c\cot\theta_{tk})$$

$$C_4 = \frac{\cos\theta_c}{\sin\theta_{tk}}$$

$$C_5 = \cos\theta_h(\sin\theta_c - \cos\theta_c\cot\theta_{tk}),$$

where $\cos\theta_{th} = \sin\alpha_r \cdot \sin\theta_h$.

Accordingly, cutting force components of each direction according to the rotation angle of the cutter are obtained by Formula 6. $K_n$, $K_f$, and $\theta_c$ according to cutter rotation angle can be obtained using $F_x$, $F_y$, and $F_z$ measured through experimentation.

$$F_x(j) = \sum_k \sum_i F_x(i,j,k) \qquad \text{[Formula 6]}$$

$$F_y(j) = \sum_k \sum_i F_y(i,j,k)$$

$$F_z(j) = \sum_k \sum_i F_z(i,j,k)$$

Figure 4:
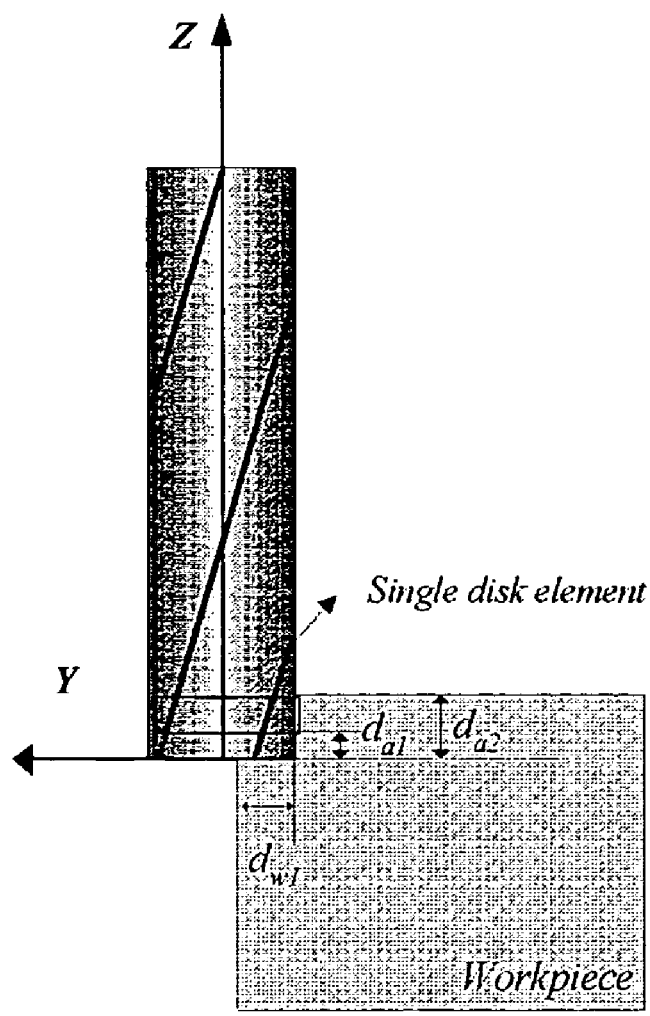
FIG. 4 is a drawing used to describe a method of calculating a cutting force coefficient.
Figure 5:
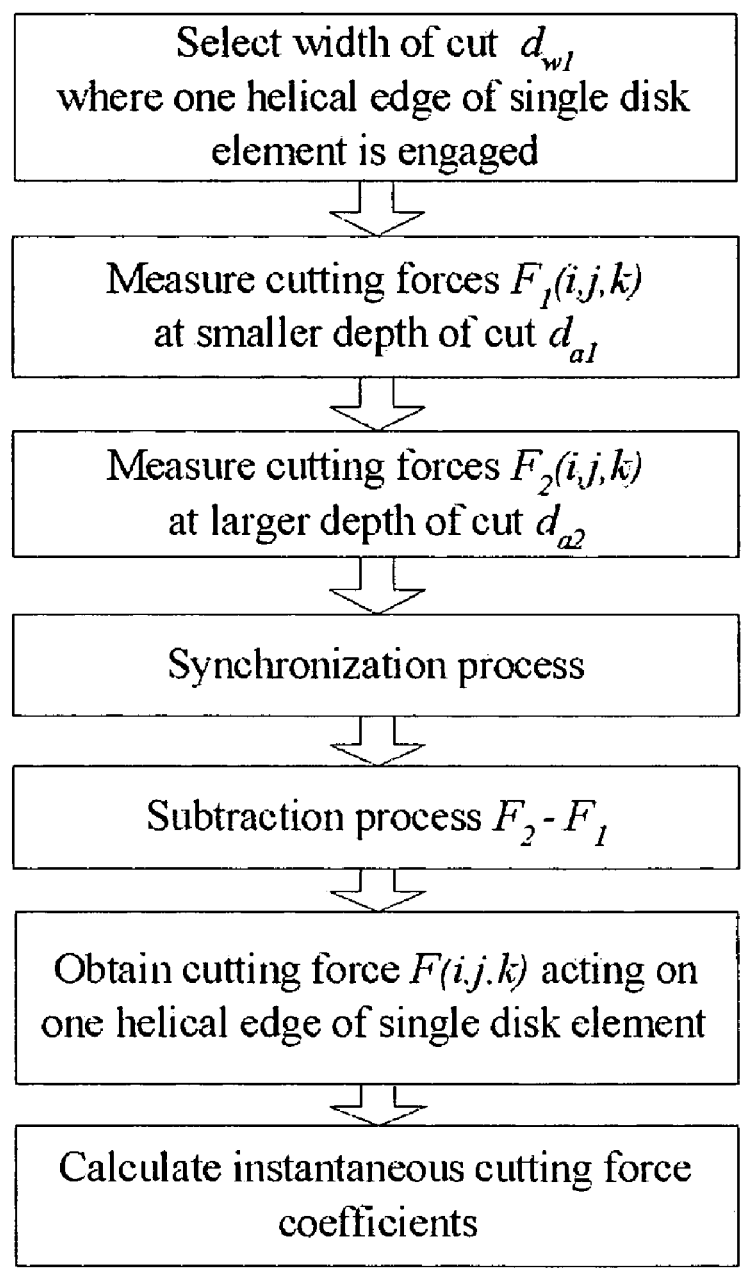
FIG. 5 is a flow chart of a method for calculating a cutting force coefficient.

FIG. 4 is a drawing used to describe a method of calculating a cutting force coefficient, and FIG. 5 is a flow chart of a method for calculating a cutting force coefficient.

The cutting force coefficient may be obtained using an instantaneous cutting force generated by a cutting edge of a tool disk element obtained by the method as shown in FIG. 4. Flat end milling includes a bottom edge and a helical edge, and since the cutting force model is realized with respect to the geometry of the helical edge, the cutting force coefficient is obtained using the cutting force generated by the helical edge.

With reference to FIG. 5, if a cutting force measured under conditions of a small axial depth of cut is subtracted from a cutting force measured under conditions of a large axial depth of cut, a cutting force generated by a helical edge of a unit disk element can be obtained. That is, cutting forces $F_2$ and $F_1$ are measured respectively in axial depths of cut $d_{a2}$ and $d_{a1}$ ($d_{a2} > d_{a1}$). Next, if $F_1$ is subtracted from $F_2$ after synchronization of each cutting force measured value and estimated value, cutting force F(i,j,k) applied to the helical edge of a unit disk element can be obtained. Using this cutting force F(i,j,k), tool runout and cutting force coefficient can be obtained using formulae 7, 8, and 9. The developed cutting force coefficient appears in the following independent form with respect to cutting conditions. The non-linearity is a result of the fact that the cutting force coefficient is influenced by size effect in an area where uncut chip thickness reduces.

$$\ln(K_n(i,j,k)) = A_1 - (A_1 - A_2)e^{-(A_3 t_c(i,j,k))^{A_4}} \qquad \text{[Formula 7]}$$

$$K_f(i,j,k) = B_1 - (B_1 - B_2)e^{-(B_3 t_c(i,j,k))^{B_4}} \qquad \text{[Formula 8]}$$

$$\theta_c(i,j,k) = C_1 - (C_1 - C_2)e^{-(C_3 t_c(i,j,k))^{C_4}} \qquad \text{[Formula 9]}$$

Figure 6:
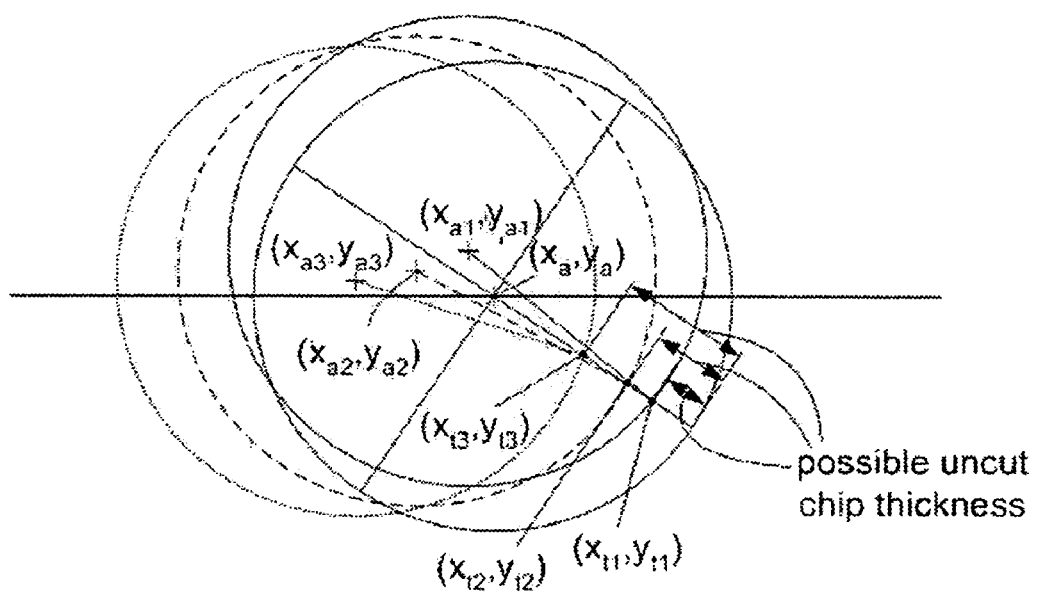
FIG. 6 is a drawing used to describe a method of calculating a thickness of an uncut chip.

FIG. 6 is a drawing used to describe a method of calculating uncut chip thickness.

An uncut chip thickness model is needed to calculate cutting force in Formula 5.

Formula 10 is used to model uncut chip thickness using the cutter geometry. This model has the advantage of requiring only a minimal time to calculate uncut chip thickness, but it is limited in its precision as it simply reflects a geometric state.

$$t_c(\phi) = f_t \sin \phi \qquad \text{[Formula 10]}$$

In this exemplary embodiment, uncut chip thickness is calculated while following the movement of the tool. That is, a difference between a track of a previous edge left on a surface of the workpiece and a present position of the tool is used to obtain the uncut chip thickness. As shown in FIG. 6, in order to obtain the uncut chip thickness, it is necessary to first know $x_{am}$ and $y_{am}$. $x_{tm}$ and $y_{tm}$ are determined using Formulae 11 below. $x_{am}$ and $y_{am}$ in the Formulae 11 are a center position of the tool when a previous edge (an edge in $m=1\sim n_f$) passes an angle position ($\phi$) of a present edge, and $x_{tm}$ and $y_{tm}$ indicate positions of a previous edge at $x_{am}$ and $y_{am}$.

$$y_{tm} = (-1/\tan \phi) \cdot x_{tm}$$

$$(x_{tm} - x_{am})^2 + (y_{tm} - y_{am})^2 = R^2 \qquad \text{[Formula 11]}$$

From Formula 11, the uncut chip thickness may be calculated using Formula 12.

$$t_{cm}(i,j,k) = R - \sqrt{x_{tm}^2 + y_{tm}^2}$$

$$t_c = \text{Max}[0, \text{Min}(t_{cm}(i,j,k))] \qquad \text{[Formula 12]}$$

In the following, cutting force model, cutting force coefficients, and uncut chip thickness model in the case where a ball end milling tool is used are presented.

[Ball End Milling Cutting Force Model]

Figure 7A:
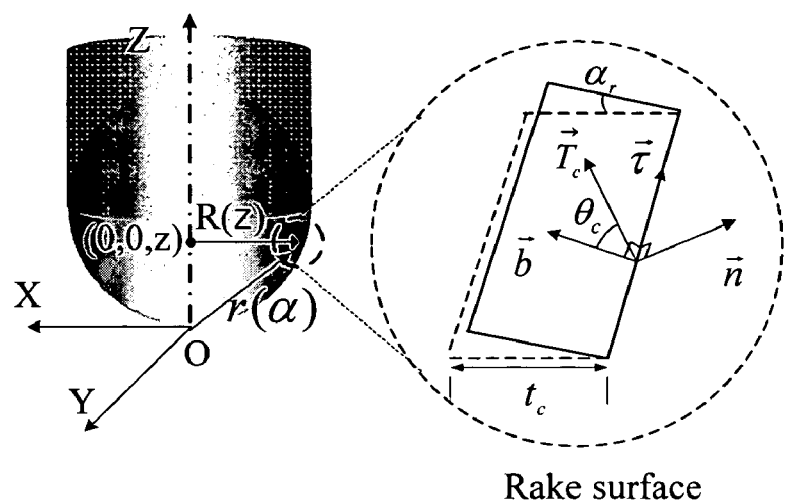
FIGS. 7A and 7B are schematic views showing a shape and coordinates of a ball end milling tool.
Figure 7B:
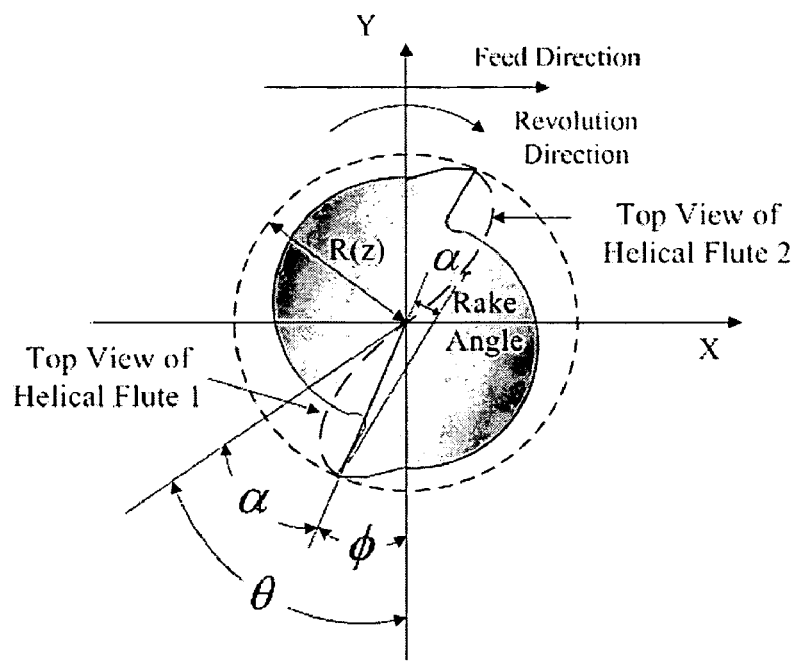

FIGS. 7A and 7B are schematic views showing a geometry and coordinates of a ball end milling tool.

The envelope of the ball part of the ball-end mill can be expressed by Formulae 13 and 14 below:

$$R(z)^2 + (z - R_0)^2 = R_0^2 \qquad \text{[Formula 13]}$$

$$R(z)^2 = x^2 + y^2 \qquad \text{[Formula 14]}$$

where $R_o$ is a ball radius at a circle of a hemisphere center, and $R(z)$ is a radius in an x-y plane at a specific z.

A local helical angle is determined by Formula 15 below.

$$\theta_{hl}(z) = \tan^{-1}\left(\frac{R(z) \cdot \tan\theta_h}{R_0}\right) \qquad \text{[Formula 15]}$$

In FIG. 7A, a vertical unit vector ($\vec{n}$) and a chip flow vector ($\vec{T}_c$) are defined on the rake surface of a differentiated cutting edge. As a result, the normal pressure force and the frictional force acting on the rake surface can be derived. In order to derive the formula for ball end milling, the unit vectors are obtained when the cutter rotation angle $\theta=0$ and the local helical angle $\theta_h=0$. The unit vectors having rake angle ($\alpha_r$) are designated as follows. That is, the unit vectors $\vec{n}$ normal to the rake surface are determined by Formula 16 below.

$$\vec{n} = \cos \alpha_r \vec{i} - \sin \alpha_r \vec{j} \qquad \text{[Formula 16]}$$

The unit vectors tangent to the cutting edge are obtained by Formula 17 below.

$$\vec{\tau}(\alpha) = \frac{d\vec{r}}{\|d\vec{r}\|} = \frac{dy\vec{j} + dz\vec{k}}{\sqrt{dy^2 + dz^2}} = \tau_y \vec{j} + \tau_z \vec{k} = \frac{f_1}{f_2}\vec{j} + \frac{1}{f_2}\vec{k} \qquad \text{[Formula 17]}$$

where $f_1 = \frac{dy}{dz} = \frac{(z - R_0)}{\sqrt{R_0^2 - (z - R_0)^2}}$ and $f_2 = \sqrt{f_1^2 + 1}$.

The unit vector $\vec{b}$ that is normal to the tangential direction of the cutting edge and on the rake surface is as shown in Formula 18 below.

$$\vec{b} = \vec{\tau} \times \vec{n} = \frac{1}{f_2}\sin \alpha_r \vec{i} + \frac{1}{f_2}\cos \alpha_r \vec{j} - \frac{f_1}{f_2}\cos \alpha_r \vec{k} \qquad \text{[Formula 18]}$$

Accordingly, the chip flow vector is obtained by Formula 19 below.

$$\begin{aligned}
\vec{T}_c &= \cos\theta_c \vec{b}(\alpha) + \sin\theta_c \vec{\tau}(\alpha) \\
&= \cos\theta_c \left(\frac{1}{f_2}\sin\alpha_r \vec{i} + \frac{1}{f_2}\cos\alpha_r \vec{j} - \frac{f_1}{f_2}\cos\alpha_r \vec{k}\right) + \\
&\quad \sin\theta_c \left(\frac{f_1}{f_2}\vec{j} + \frac{1}{f_2}\vec{k}\right) \\
&= \cos\theta_c \sin\alpha_r \frac{1}{f_2}\vec{i} + \left(\cos\theta_c \frac{1}{f_2}\cos\alpha_r + \sin\theta_c \frac{f_1}{f_2}\right)\vec{j} + \\
&\quad \left(-\cos\theta_c \frac{f_1}{f_2}\cos\alpha_r + \sin\theta_c \frac{1}{f_2}\right)\vec{k}
\end{aligned} \qquad \text{[Formula 19]}$$

The cutting force on the rake surface is determined by two orthogonal components, that is, a normal pressure force and a frictional force as shown in Formulae 20 and 21 below.

$$dF_n(i,j,k) = K_n T(\phi, \theta_{hl})\vec{n}\, dA_c \qquad \text{[Formula 20]}$$

$$dF_f(i,j,k) = K_f K_n T(\phi, \theta_{hl})\vec{T}_c\, dA_c \qquad \text{[Formula 21]}$$

The transformation matrix resulting from the cutter rotation angle $\theta$ and the helical angle $\theta_h$ is obtained using Formula 22 below.

$$\begin{aligned}
T(\phi, \theta_h) &= \begin{bmatrix} \cos(-\theta + \alpha) & -\sin(-\theta + \alpha) & 0 \\ \sin(-\theta + \alpha) & \cos(-\theta + \alpha) & 0 \\ 0 & 0 & 1 \end{bmatrix} \\
&\quad \begin{bmatrix} \cos(\theta_h) & 0 & \sin(\theta_h) \\ 0 & 1 & 0 \\ -\sin(\theta)_h & 0 & \cos(\theta_h) \end{bmatrix} \\
&= \begin{bmatrix} \cos\phi\cos\theta_h & -\sin\phi & \cos\phi\sin\theta_h \\ \sin\phi\cos\theta_h & \cos\phi & \sin\phi\sin\theta_h \\ -\sin\theta_h & 0 & \cos\theta_h \end{bmatrix}
\end{aligned} \qquad \text{[Formula 22]}$$

If the normal pressure force and the frictional force on the rake surface are converted into a cutting force of three axial directions, the following Formulae 23, 24, and 25 result.

$$F_x(i,j,k) = \Bigg[K_n(\cos\alpha_r\cos\phi\cos\theta_h + \sin\alpha_r\sin\phi) + \\ K_nK_f\Bigg[\cos\theta_c\sin\alpha_r\frac{1}{f_2}\cos\phi\cos\theta_h - \\ \left(\cos\theta_c\frac{1}{f_2}\cos\alpha_r + \sin\theta_c\frac{f_1}{f_2}\right)\sin\phi + \\ \left(-\cos\theta_c\frac{f_1}{f_2}\cos\alpha_r + \sin\theta_c\frac{1}{f_2}\right)\cos\phi \\ \sin\theta_h\Bigg]dA_c \\ = \Bigg[K_n(\cos\alpha_r\cos\phi\cos\theta_h + \sin\alpha_r\sin\phi) + \\ K_nK_f\cos\theta_c\Bigg[\sin\alpha_r\frac{1}{f_2}\cos\phi\cos\theta_h - \\ \frac{1}{f_2}\cos\alpha_r\sin\phi - \frac{f_1}{f_2}\cos\alpha_r\cos\phi\sin\theta_h\Bigg] + \\ K_nK_f\sin\theta_c\Bigg[-\frac{f_1}{f_2}\sin\phi + \frac{1}{f_2}\cos\phi\sin\theta_h\Bigg]dA_c$$ [Formula 23]

$$F_y(i,j,k) = \Bigg[K_n(\cos\alpha_r\sin\phi\cos\theta_h - \sin\alpha_r\cos\theta) + \\ K_nK_f\Bigg[\cos\theta_c\sin\alpha_r\frac{1}{f_2}\sin\phi\cos\theta_h + \\ \left(\cos\phi_c\frac{1}{f_2}\cos\alpha_r + \sin\theta_c\frac{f_1}{f_2}\right)\cos\phi + \\ \left(-\cos_c\frac{f_1}{f_2}\cos\alpha_r + \sin\theta_c\frac{1}{f_2}\right) \\ \sin\phi\sin\theta_h\Bigg]dA_c \\ = [K_n(\cos\alpha_r\sin\phi\cos\theta_h - \sin\alpha_r\cos\phi) + \\ K_nK_f\cos\theta_c\Bigg(\sin\alpha_r\frac{1}{f_2}\sin\phi\cos\theta_h + \\ \frac{1}{f_2}\cos\alpha_r\cos\phi - \frac{f_1}{f_2}\cos\alpha_r\sin\phi\sin\theta_h\Bigg) + \\ K_nK_f\sin\theta_c\Bigg(\frac{f_1}{f_2}\cos\phi + \frac{1}{f_2}\sin\phi\sin\theta_h\Bigg)\Bigg]dA_c$$ [Formula 24]

$$F_z(i,j,k) = \Bigg[-K_n\sin\theta_h\cos\alpha_r + \\ K_nK_f\Bigg[-\cos\theta_c\sin\alpha_r\frac{1}{f_2}\sin\theta_h + \\ \left(-\cos\theta_c\frac{f_1}{f_2}\cos\alpha_r + \sin\theta_c\frac{1}{f_2}\right)\cos\theta_h\Bigg]dA_c \\ = \Bigg[-K_n\sin\theta_h\cos\alpha_r + K_nK_f\cos\theta_c\Bigg(- \\ \sin\alpha_r\frac{1}{f_2}\sin\theta_h - \frac{f_1}{f_2}\cos\alpha_r\cos\theta_h\Bigg) + \\ K_nK_f\sin\theta_c\frac{1}{f_2}\cos\theta_h\Bigg]dA_c$$ [Formula 25]

Each directional cutting force component according to the rotation angle of the cutter can be obtained using Formula 26 below. Using the cutting force $F_j$ measured from experiment, the cutting force coefficient according to cutter rotation angle, $K_n$, $K_f$, and $\theta_c$ can be obtained.

$$F_j = \sum_k \sum_i F_{ijk}$$ [Formula 26]

If Formula 26 is put in matrix form, Formula 27 is obtained.

where $$\begin{Bmatrix} F_x \\ F_y \\ F_z \end{Bmatrix} = \begin{bmatrix} A_{11} & A_{12} & A_{13} \\ A_{21} & A_{22} & A_{23} \\ A_{31} & A_{32} & A_{33} \end{bmatrix} \begin{Bmatrix} K_1 \\ K_2 \\ K_3 \end{Bmatrix}$$ [Formula 27]

where $K_1 = K_n$ $K_2 = \cos\theta_c K_n K_f$ $K_3 = \sin\theta_c K_n K_f$ $A_{11} = B_1 \sum_k \sum_i (\cos\alpha_r\cos\phi\cos\theta_h + \sin\alpha_r\sin\phi) \cdot t_c(\phi)$ $A_{12} =$ $$B_1 \sum_k \sum_i \left(\sin\alpha_r\frac{1}{f_2}\cos\phi\cos\theta_h - \frac{1}{f_2}\cos\alpha_r\sin\phi - \frac{f_1}{f_2}\cos\alpha_r \cos\phi\sin\theta_h\right) \cdot t_c(\phi)$$

$A_{13} = B_1 \sum_k \sum_i \left(-\frac{f_1}{f_2}\sin\phi + \frac{1}{f_2}\cos\phi\sin\theta_h\right) \cdot t_c(\phi)$ $A_{21} = B_1 \sum_k \sum_i (\cos\alpha_r\sin\phi\cos\theta_h - \sin\alpha_r\cos\phi) \cdot t_c(\phi)$ $A_{22} =$ $$B_1 \sum_k \sum_i \left(\sin\alpha_r - \frac{1}{f_2}\sin\phi\cos\theta_h + \frac{1}{f_2}\cos\alpha_r\cos\phi - \frac{f_1}{f_2}\cos\alpha_r\sin\phi\sin\theta_h\right) \cdot t_c(\phi)$$

$A_{23} = B_1 \sum_k \sum_i \left(\frac{f_1}{f_2}\cos\phi + \frac{1}{f_2}\sin\phi\sin\theta_h\right) \cdot t_c(\phi)$ $A_{31} = B_1 \sum_k \sum_i (-\sin\theta_h\cos\alpha_r) \cdot t_c(\phi)$ $A_{32} = B_1 \sum_k \sum_i \left(-\sin\alpha_r\frac{1}{f_2}\sin\theta_h - \frac{f_1}{f_2}\cos\alpha_r\cos\theta_h\right) \cdot t_c(\phi)$ $K_1$, $K_2$, and $K_3$ can be obtained from the measured cutting force, and the cutting force coefficient can be calculated using Formula 28 as follows.

$$K_n = K_1$$
$$\theta_c = \tan^{-1}\left(\frac{K_3}{K_2}\right)$$
$$K_f = \frac{K_2}{\cos\theta_c K_n}$$ [Formula 28]

Figure 8:
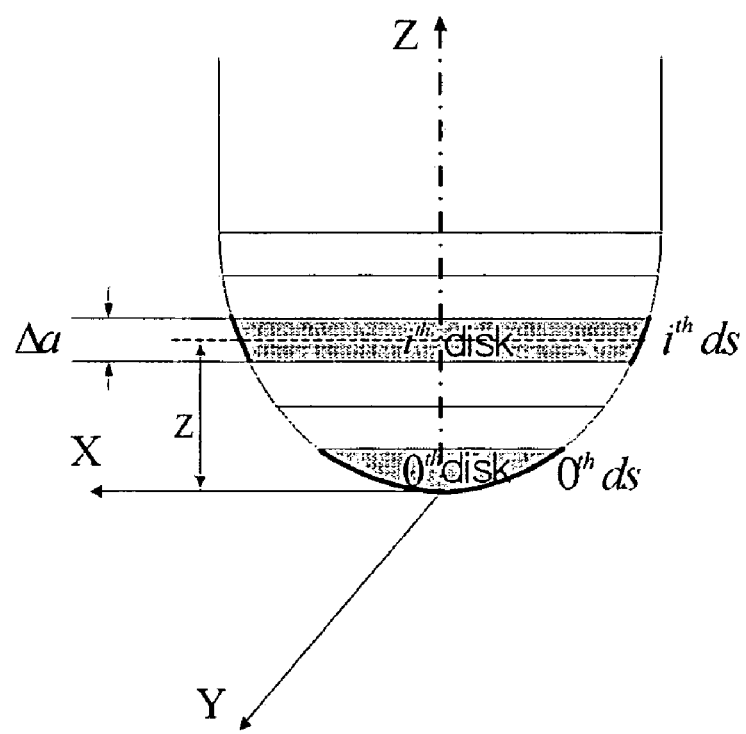
FIG. 8 is a drawing used to describe a size effect according to the geometry of a tool.

FIG. 8 is a drawing used to describe a size effect according to geometry of a tool.

FIG. 8 shows the changes in the length of the cutter edge per unit disk element. If the height of a disk element ($\Delta a$) is constant along the z-axis, the length of the cutter edge (ds) increases rapidly as the z position of the disk element approaches zero. This change in the cutter edge length alters the area of the flank face contacting the workpiece accordingly. The force increases as the z position approaches the bottom disk, although the uncut chip thickness remains unchanged at the same cutter edge location angle. This directly influences the size effect of a ball-end mill in the form of the plowing force acting on the rounded edge or flank face of the cutter. In the present invention, the disk edge length is used to obtain this effect such that the cutting force coefficient changes in the axial direction are considered.

In ball end milling, after obtaining a cutting force generated by disk elements by the method shown in FIG. 8, the cutting force coefficient is obtained. The cutting force coefficient is determined using Formulae 29, 30, and 31 below. Since the cutting force coefficient formulae of the present invention are independent of cutting conditions, cutting force coefficients can be estimated through two calibration tests. As shown in Formula 29 below, $K_n$ is obtained considering size effect generated by each disk edge and with respect to rescaled instantaneous uncut chip thickness $t_{cr}$ using each disk edge length $d_s$.

$$\ln(K_n) = A_1 - (A_1 - A_2)e^{-(A_3 t_{cr})^{A_4}} \quad \text{[Formula 29]}$$

where $$t_{cr}(i, j, k) = \frac{t_c(i, j, k)/\cos\theta_{hl}}{ds(k)/\Delta a}.$$

Figure 9:
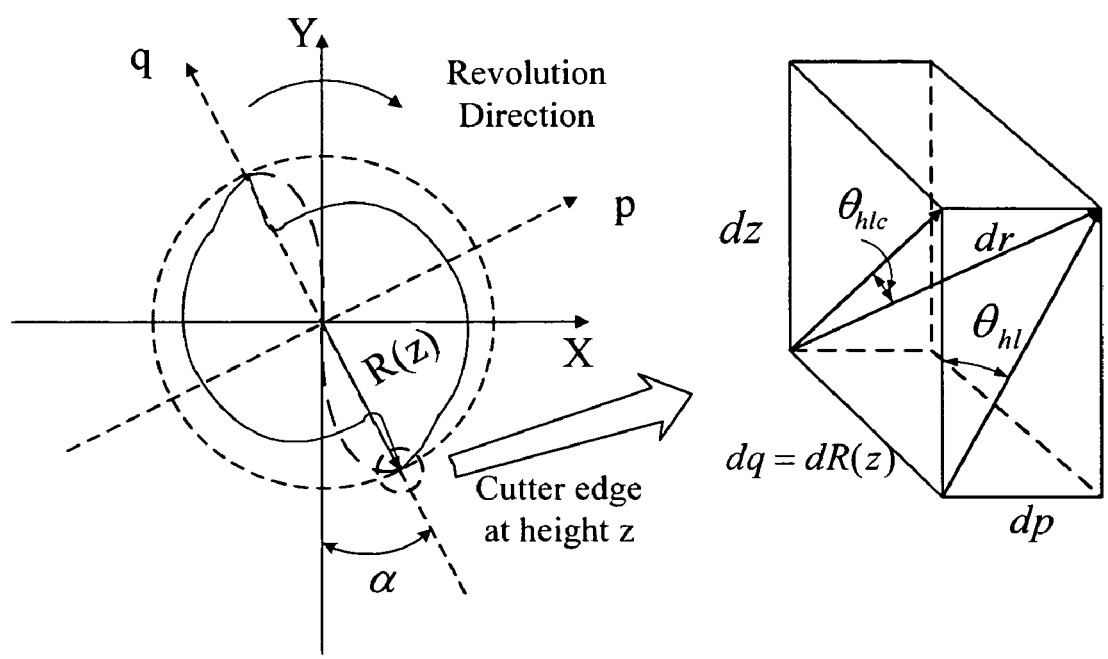
FIG. 9 is a schematic view showing a local helical angle $\theta_{hl}$ and a local effective helical angle $\theta_{hlc}$ in a ball end milling tool.

Since $K_f$ and $\theta_c$ are not affected by the length of each disk edge, they are obtained using the instantaneous uncut chip thickness $t_{cr}$.

$$K_f = B_1 - (B_1 - B_2)e^{-(B_3 t_c)^{A_4}} \quad \text{[Formula 30]}$$

$$\theta_c - \theta_{hlc} = \frac{C_1 - C_2}{1 + (t_c/C_3)^{C_4}} + C_2 \quad \text{[Formula 31]}$$

where $\theta_{hlc}$ is a local effective helical angle of a ball region that affects chip flow. The localized helical angle $\theta_{hl}$ and the localized effective helical angle $\theta_{hlc}$ appear in FIG. 9.

Figure 10A:
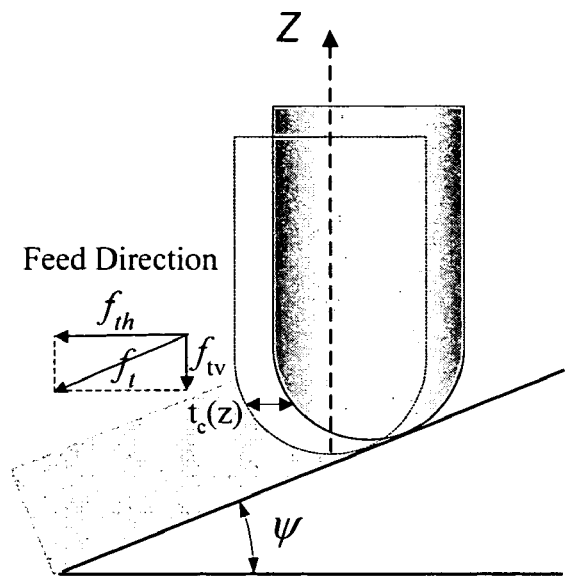
FIG. 10A is a schematic view showing feed rate components in 3D machining of ball end milling.
Figure 10B:
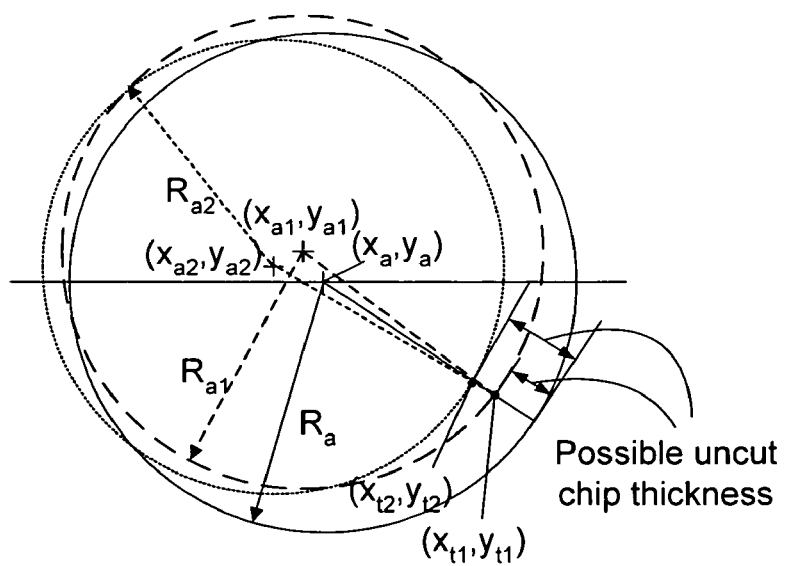
FIG. 10B is a drawing used to describe the calculation of an uncut chip thickness in ball end milling.

FIG. 10A is a schematic view showing feed rate components in 3D machining of ball end milling, and FIG. 10B is a drawing used to describe the calculation of uncut chip thickness in ball end milling.

In the 3D machining shown in FIG. 10A, the uncut chip thickness is calculated using Formula 32 below.

$$t_c(z) = f_t \cdot \sin\phi \cdot \cos\psi + DR(z) \quad \text{[Formula 32]}$$

where $DR(z) = R(z) - R(z + f_t \sin\psi)$, and this term refers to the generation of an uncut chip thickness by changes in a tool disk radius at the same height by axial direction feed component in three-dimensional machining. In Formula 32, if $t_c(z) = R(z)$, $z + f_t \sin\psi \leq 0$.

In the 3D machining shown in FIG. 10A, in order to take into consideration changes in uncut chip thickness caused by vertical feed component, changes in radius according to cutter axial direction as shown in 33 below were considered.

$$y_{tm} = \frac{-1}{\tan\phi} x_{tm} \quad \text{[Formula 33]}$$

$$(x_{tm} - x_{am} + x_a)^2 + (y_{tm} - y_{am} + y_a)^2 = R_{am}^2$$

where $Ram = R(z + mf_t \sin\Phi)$.

Accordingly, uncut chip thickness is calculated using the following Formula 34 in FIG. 10B.

$$t_{cm}(i,j,k,m) = R(z) - \sqrt{x_{tm}(m)^2 + y_{tm}(m)^2}$$

$$t_c(z) = \text{Max}[0, \text{Min}(t_{cm}(i,j,k,m))] \quad \text{[Formula 34]}$$

where $t_{cm}(i,j,k,m)$ refers to a possible chip thickness, $x_{tm}$ and $y_{tm}$ indicate a cutting edge position $(m=1\sim n_f)$ at a previous edge, and $t_c$ is an actual uncut chip thickness.

[Machined Surface Error Model]

In the following, a machined surface error model is described. This model is used to estimate surface errors when machined surface errors are selected as the constraint variable.

Figure 11A:
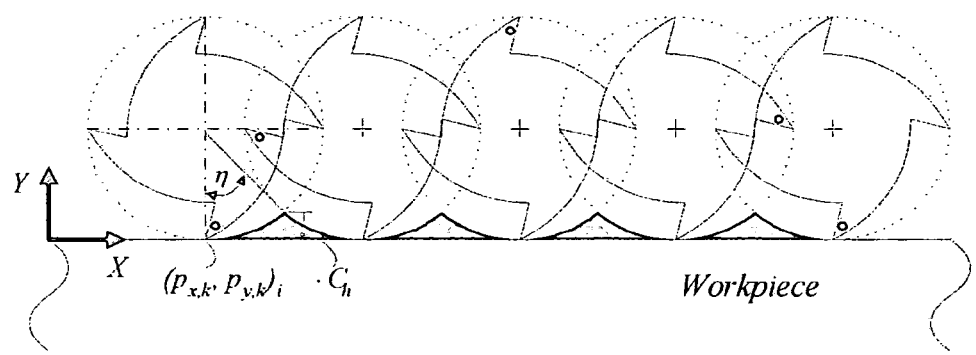
FIG. 11A is a drawing used to describe a first case in which machined surface errors are generated.
Figure 11B:
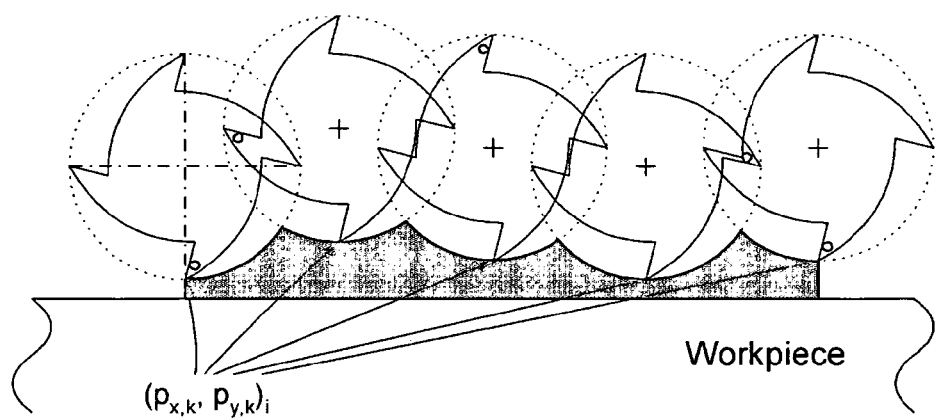
FIG. 11B is a drawing used to describe a second case in which machined surface errors are generated.

As shown in FIG. 11A, if it is assumed that ideal movement occurs only by a nominal feed rate, a trace of a disk element can be assumed to be a circular arc. Such an assumption is suitable when the cutting feed rate is extremely small compared to the diameter of the tool. It is used by many research scientists. In the present invention, the machined surface error model for considering tool runout and deflection is developed from the cutting force model. During machining, even if a center coordinate of a disk element strays from a nominal value by tool deflection and runout, the movement as shown in FIG. 11B occurs. Further, in FIG. 11c, there are shown machined surface errors generated by ball-end mill geometry and a tool path distance. In the present invention, machined surface errors occurring in the cutting process are calculated by estimating these machined situations.

Surface Error Estimation in First Case (FIG. 11A)

Figure 12:
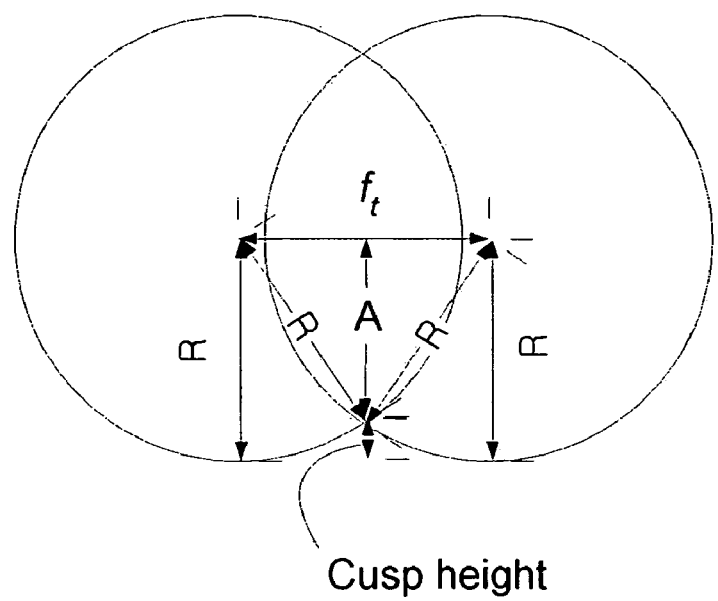
FIG. 12 is a drawing used to describe a machined surface error.

Cusp errors (or cutter marks) that may develop by flat end milling and ball end milling are generated by feed per tooth $f_t$ and tool radius R as shown in FIG. 12. The cusp error $C_h$ of FIG. 11A is calculated using Formula 35 below.

$$C_h = R - A \quad \text{[Formula 35]}$$

$$A = \sqrt{R^2 - \left(\frac{f_t}{2}\right)^2}$$

$$C_h = R - \sqrt{R^2 - \left(\frac{f_t}{2}\right)^2}$$

Surface Error Estimation in Second Case (FIG. 11B)

Figure 13:
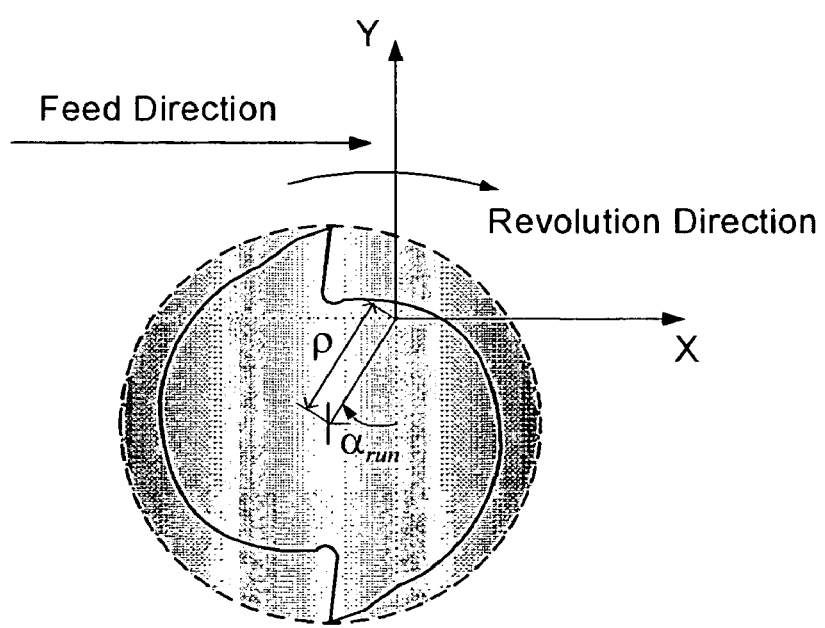
FIG. 13 is a drawing used to describe run out of a tool.

Tool runout generated during tool set up may be determined by offset and its angle term as shown in FIG. 13. Variations in tool center coordinates by tool runout are obtained by Formula 36 below.

$$x_\rho(j) = -\rho\sin(\alpha_{run} - \theta(j))$$

$$y_\rho(j) = -\rho\cos(\alpha_{run} - \theta(j)) \quad \text{[Formula 36]}$$

Figure 14:
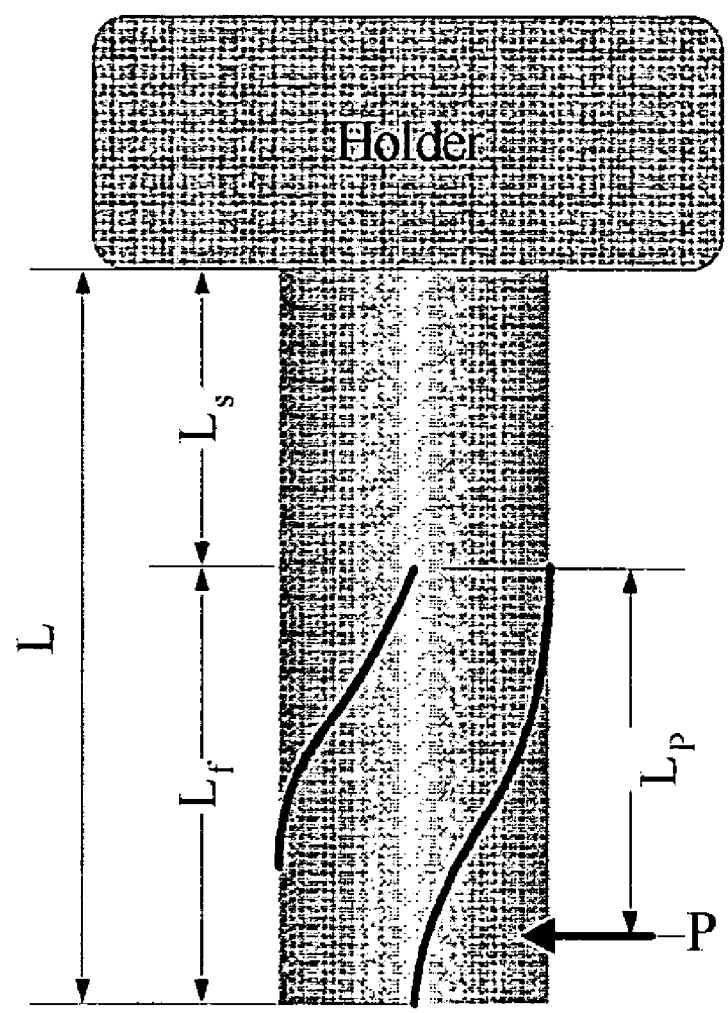
FIG. 14 is a drawing used to describe tool deflection.

FIG. 14 shows tool deflection when it is assumed that the tool is a two stepped cantilever beam and a static force is applied to the tool. A formula used to obtain a position of each disk element using the force applied to each z-axis disk element is Formula 37 below.

$$X_d(k, j) = \frac{P_x}{6EI_s}[2 \cdot L_s^3 + 3 \cdot L_p \cdot L_s^2] + \quad \text{[Formula 37]}$$

$$\frac{P_x}{2EI_s}[L_s^3 + 2 \cdot L_p \cdot L_s] \cdot (L_f - z) +$$

$$\frac{P_x}{6EI_f}[(L_f - L_p - z)^3 - (L_f - z)^3 +$$

$$3 \cdot L_p \cdot (L_f - z)^2]$$

-continued $$Y_d(k, j) = \frac{P_y}{6EI_s}[2 \cdot L_s^3 + 3 \cdot L_p \cdot L_s^2] +$$

$$\frac{P_y}{2EI_s}[L_s^3 + 2 \cdot L_p \cdot L_s] \cdot (L_f - z) +$$

$$\frac{P_x}{6EI_f}[(L_f - L_p - z)^3 - (L_f - z)^3 +$$

$$3 \cdot L_p \cdot (L_f - z)^2]$$

where $L_s$ and $L_f$ are the shank part length and the flute length, respectively. $L_p$ indicates the length from the position where the cutting forces act to the boundary between flute and shank part. E is Young's modulus. The moments of inertia for the shank and that of the flute part were calculated as $I_f = D^4/52.84$ and $I_s = \pi \cdot D^4/64$, respectively.

Using the cutting edge coordinates obtained while determining uncut chip thickness according to tool movement, machined surface errors are more easily estimated. In the case of actual machining, machined surface errors may be obtained using cutting edge position $(p_{x,k}, p_{y,k})_i$ at the instant when the cutting edge position angle, which passes the machined surface, is 0. Further, using $(p_{x,k}, p_{y,k})_i$ coordinates at each disk element, three-dimensional machined errors may be formed. The $(p_{x,k}, p_{y,k})_i$ coordinates show the passed positions of the actual tool edge, that is, the positions including machined surface errors. These machined surface errors may be calculated using the following Formula 38.

$$E(j,k) = y_p(j) + Y_d(j,k) \quad \text{[Formula 38]}$$

Figure 11C:
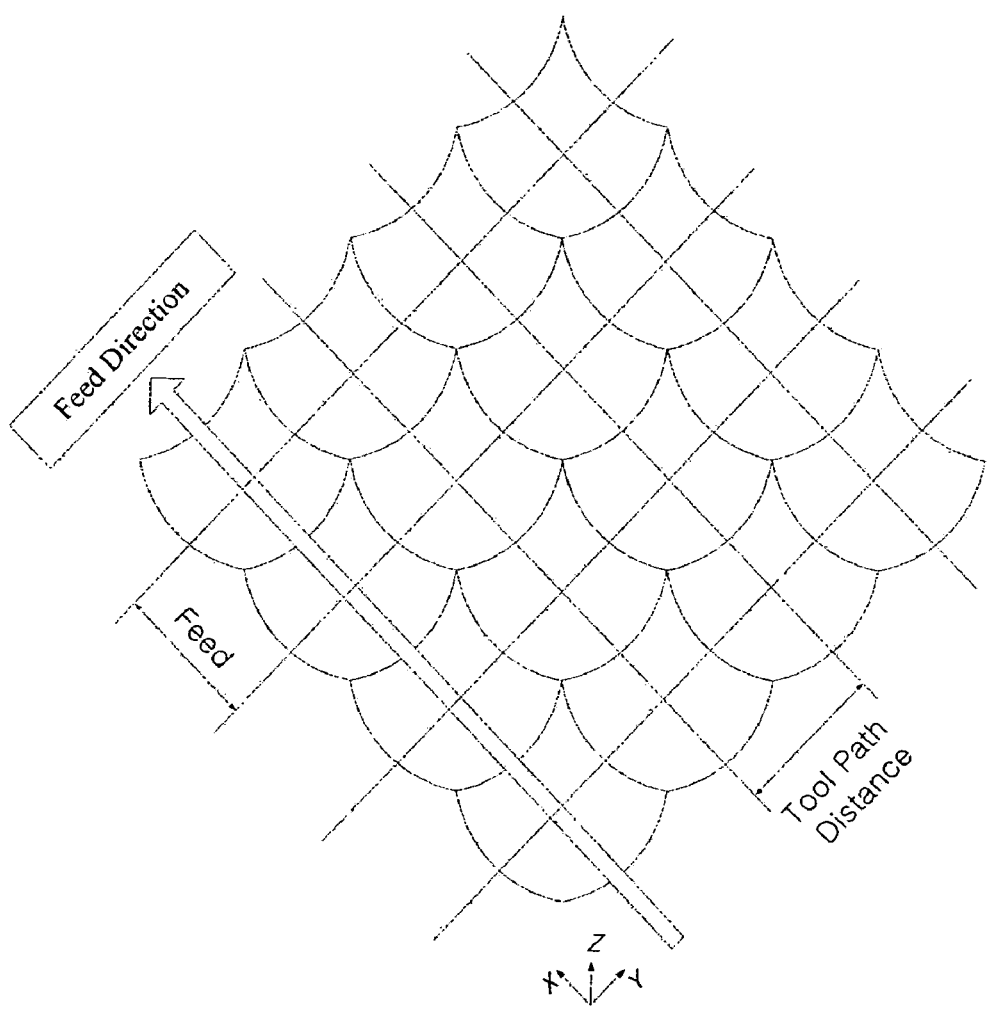
FIG. 11c is a drawing used to describe a third case in which machined surface errors are generated.

Surface Error Estimation in Third Case (FIG. 11c)

Figure 15A:
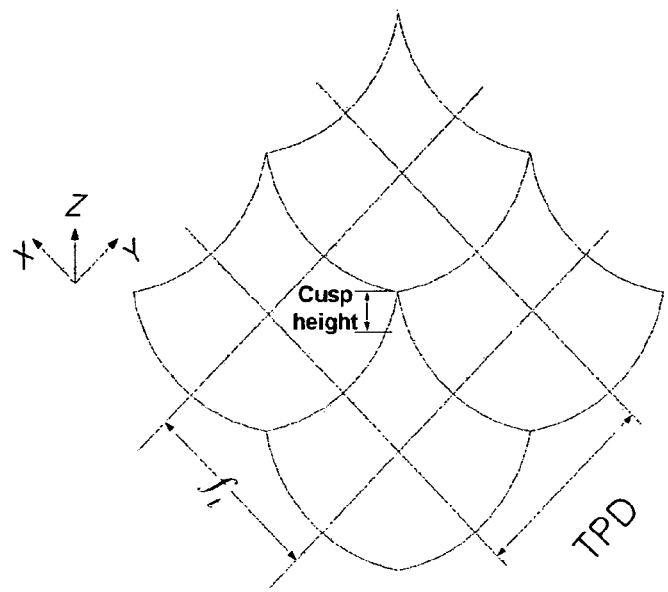
FIGS. 15A and 15B are schematic views showing a shape of cusps.
Figure 15B:
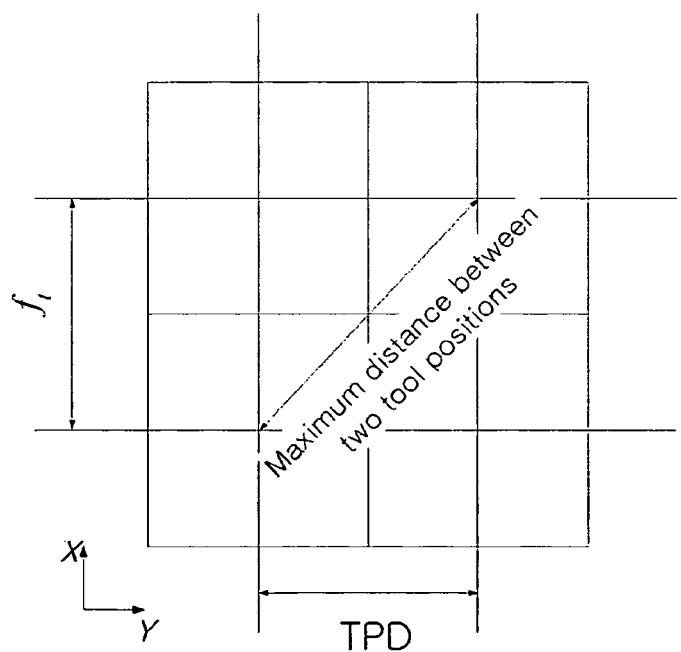
Figure 15C:
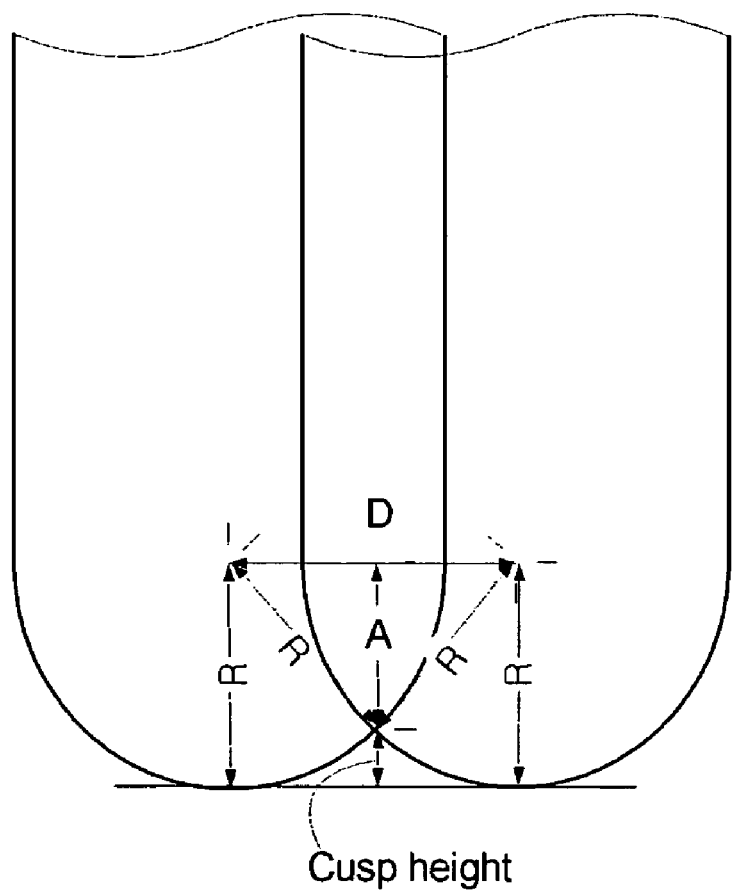
FIG. 15C is a drawing used to describe a method of calculating a cusp height.

FIGS. 15A and 15B are schematic views showing a shape of cusps, and FIG. 15C is a drawing used to describe a method of calculating a cusp height. In FIG. 14, a distance between tool centers varies by a tool path distance TPD and edge feed rate $f_t$, and this affects cusp height. The greatest cusp height is formed when the distance between tool centers is at a maximum. Cusp height is calculated by Formula 39 below.

$$D = \sqrt{(TPD^2 + f_t^2)} \quad \text{[Formula 39]}$$

$$A = \sqrt{R^2 - \left(\frac{D}{2}\right)^2}$$

$$C_h = R - \sqrt{R^2 - \left(\frac{D}{2}\right)^2}$$

[ME Z-Map Model]

Figure 16:
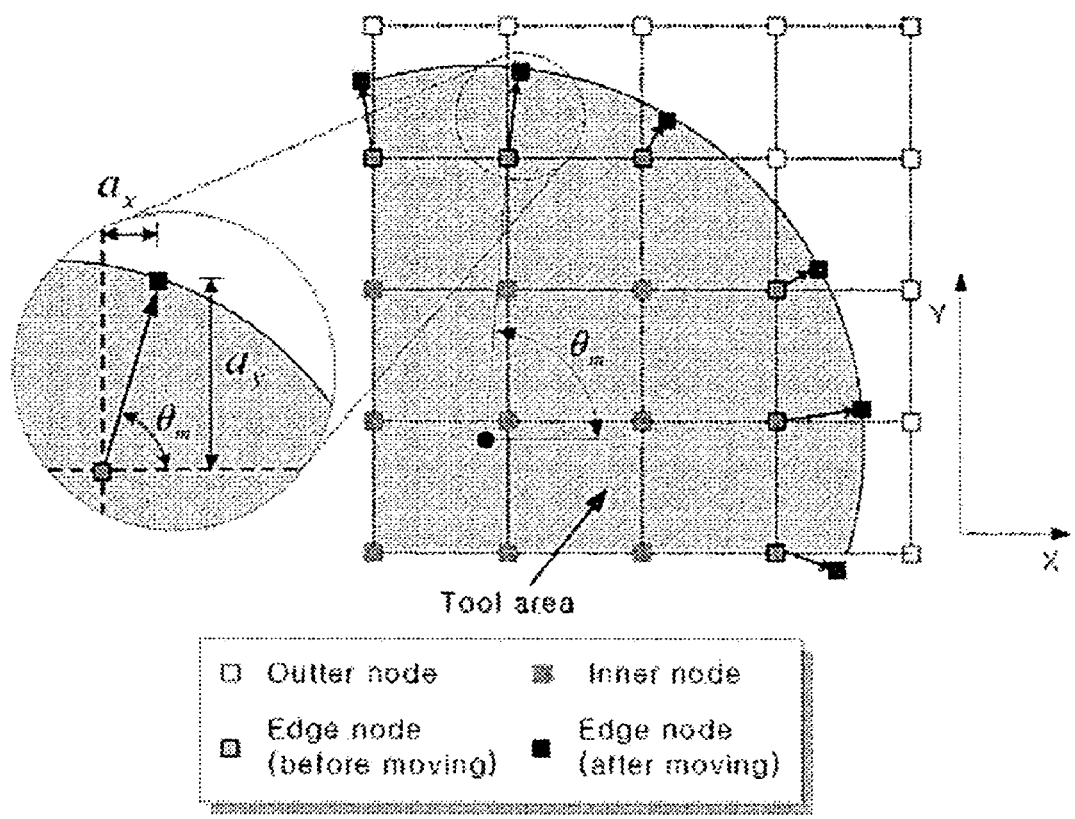
FIG. 16 is a drawing used to describe a fundamental notion for ME Z-map

As illustrated in FIG. 16, a fundamental notion for ME (Moving Edge node) Z-map is to move the edge node toward the boundary of the cutter movement. The edge node moves in the direction of $\theta_m$ which is the angle of the edge node from the cutter center, so that the coordinate of the node (i,j) is changed to:

$$x = i \cdot g + \alpha_x$$

$$y = j \cdot g + \alpha_y \quad \text{[Formula 40]}$$

where g is the elemental grid size, and $a_x$ and $a_y$ are the distances moved from the original coordinates shown in FIG. 16. The value of $a_x$ and $a_y$ should be smaller than the elemental grid size.

Figure 17:
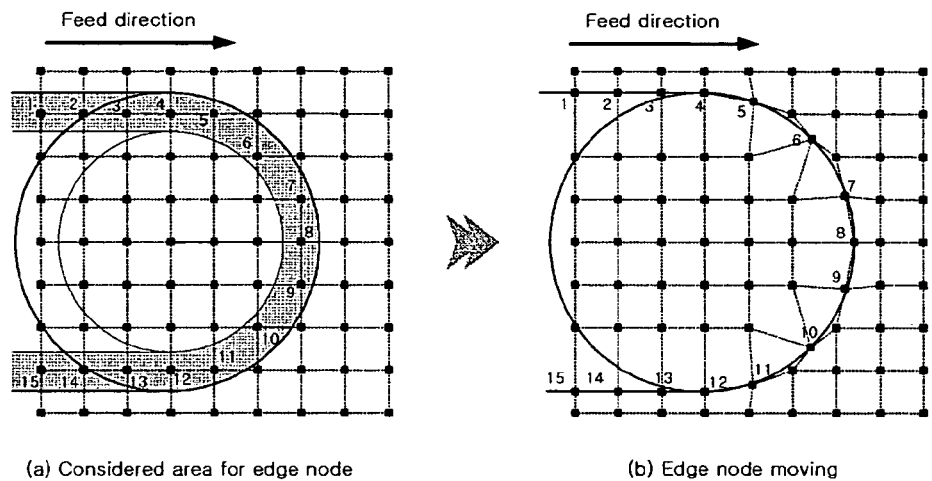
FIG. 17A is a drawing showing a edge area including a edge node.
FIG. 17B is a drawing used to describe the moved edge node.

In the simulation process, every node position is calculated one after another and the node located in edge area is defined as the edge node as illustrated in FIG. 17A. FIG. 17B shows that the boundary of the swept volume can be described precisely by moving the edge nodes are designated only in the boundary region of the swept volume; while the remaining nodes are used to describe the other regions.

Figure 18:
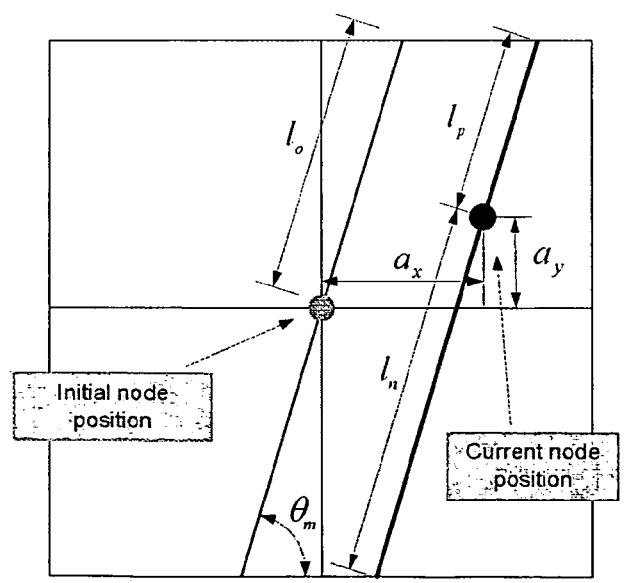
FIG. 18 is a drawing used to describe the movement limit of an edge node.

The procedure of moving an edge node consists of the next two steps. The first step is to identify whether a target node is located in the edge area or not. If the difference between the cutter radius and the distance between the target node and cutter center is smaller than the movement limit of an edge node as illustrated in FIG. 18, then the target node becomes the edge node. The movement limit can be represented by Formula 41.

$$l_p, l_n = \begin{cases} \dfrac{-a_x \cos\theta_m \pm g|\cos\theta_m|}{\cos^2\theta_m}, & \text{for } C \geq 0 \\ \dfrac{-a_y \sin\theta_m \pm g|\sin\theta_m|}{\sin^2\theta_m}, & \text{for } C < 0 \end{cases} \quad \text{[Formula 41]}$$

where $$C = |a_x + l_o\cos\theta_m| - |a_y + l_o\sin\theta_m|,$$

$$l_o = g/\max(|\cos\theta_m|, |\sin\theta_m|).$$

$I_o$ is the movement limit of the initial node position (when $a_x$ and $a_y$ are 0), and $I_p$ and $I_n$ are the movement limit for positive and negative directions, respectively. The second step is moving the target node if it is located in edge area. The moving of node can be realized by adjustment of $a_x$ and $a_y$ values. Then, the updated values, $a_x'$ and $a_y'$, can be described in Formula 42.

$$a_x' = a_x + (r_d - d_n) \cdot \cos\theta_m$$

$$a_y' = a_y + (r_d - d_n) \cdot \sin\theta_m \quad \text{[Formula 42]}$$

where $r_d$ is the boundary radius and $d_n$ is a distance between target node and cutter center.

In order to estimate the cutting force of the milling process, it is necessary to calculate a cutting configuration through simulation. The cutting configuration generally includes entry angle, exit angle, and axial depth of cut. The computing process of entry/exit angle for each node is as follows:

First, it is determined if a target node is located in the cutting area. Second, if the target node is the edge node, it is moved and a height value of node is changed. Third, if the target node is the edge node, an angle of movement direction is stored. Fourth, the entry angle and the exit angle are calculated using the stored angle of movement.

Figure 19:
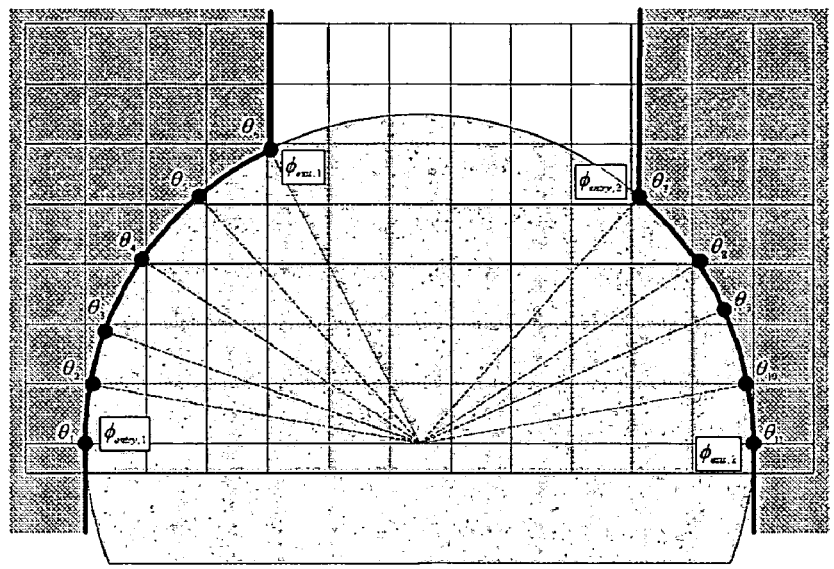
FIG. 19 is a schematic view showing the case where there are two or more of each entry and exit angles.

In a cutting condition where only one of each of an entry angle and an exit angle are existed, the largest value of the stored movement direction angles is set as the entry angle, and the smallest value is decided on the exit angle. However, as illustrated in FIG. 19, if there are two or more entry angles and exit angles, $\theta_{n-1}$ is set as the exit angle and $\theta_n$ is decide on the next entry angle when the interval between stored movement direction angles satisfies the condition of Formula 43.

$$\theta_n - \theta_{n-1} > 2\sin^{-1}\left(\frac{\sqrt{2}\,g}{r_d}\right) \quad \text{[Formula 43]}$$

where $\theta_n$ is the $n_{th}$ stored angle of movement direction.

Figure 20:
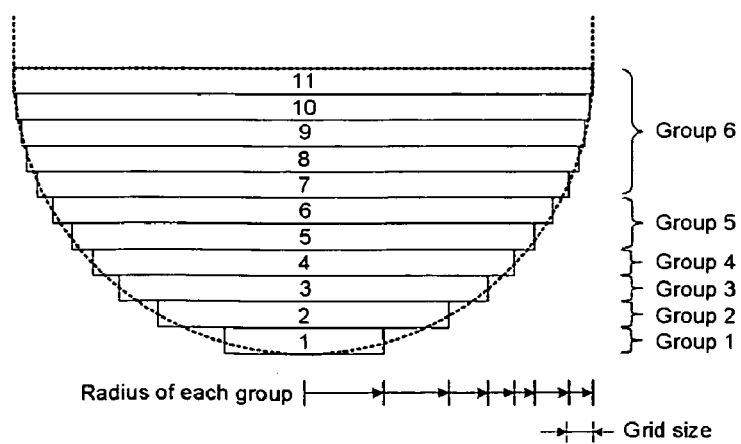
FIG. 20 is a drawing used to describe grouping method of disk elements.

In the case of flat end milling, all disk elements have the same entry and exit angles. However, in ball end milling, each disk element has a different radius as shown in FIG. 20. Thus, the entry angle and the exit angle must be calculated in every disk element. To calculate the precise entry and exit angles of the $k_{th}$ disk, the difference of radius between $k_{th}$ and $(k-1)_{th}$ disks must be larger than the grid size. (If this value is smaller than the grid size, a significant calculation error occurs because of an insufficient number of nodes.) In this invention, a grouping method which is illustrated in FIG. 20 is introduced to solve this problem. The method conducts grouping to make each disk group satisfy Formula 44.

$$r_g(n)-r_g(n-1) > \sqrt{2}g \quad \text{[Formula 44]}$$

where $r_g(n)$ is the maximum radius of a disk in $n_{th}$ disk group. The entry and exit angles are computed in each disk group, where all the disk elements have the same values.

Figure 21:
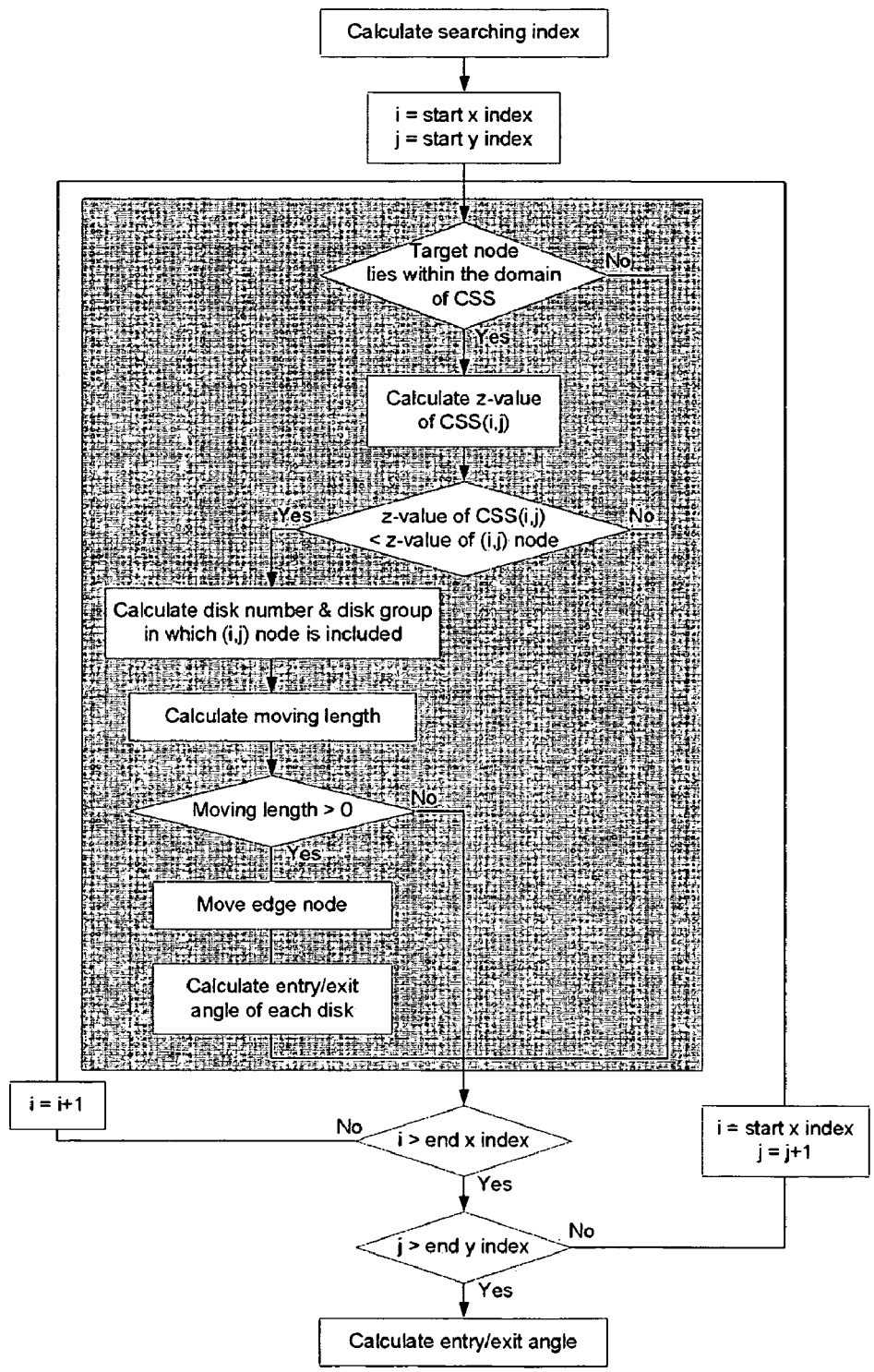
FIG. 21 is a flow chart of an algorithm for cutting configurations calculation.

A flowchart for computing the cutting configuration is illustrated in FIG. 21.

In FIG. 21, CSS (cutter swept surface) is referenced in an article [Y. C. Chung, J. W. Park, H. Shin, B. K. Choi, "Modeling the surface swept by a generalized cutter for NC verification," Computer-Aided Design, Vol. 30, No. 8, pp. 587–594, 1998.]. That is, CSS refers to a swept surface generated when ball end mill, flat end mill, etc. are moved in a straight line from one point to another point in a three-dimensional space by an NC code.

In this calculation process of the cutting configuration, an analytical method (CSS calculation method) was used to find the height value (z-value) of cutter swept surface in a specific node. The z-value is used to determine whether the target node is located in machining region or not (if a height of the target node is lower than the height of cutter swept surface in the target node, the target node is located in the machining region.)

Based on the developed cutting force model, surface error model, and the ME Z-map model, an optimum feed rate can be calculated through a feed rate scheduling algorithm, which will be described below.

Figure 22A:
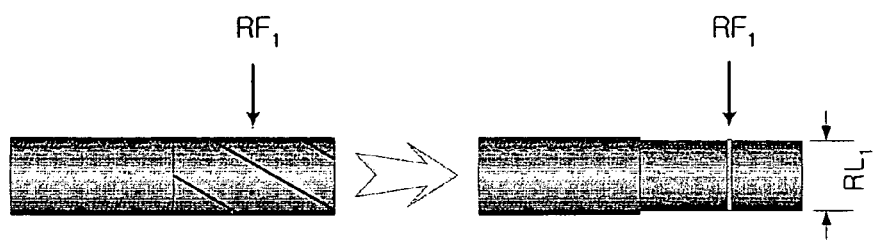
FIGS. 22A and 22B are drawings used to describe the determination of a reference cutting force based on a transverse rupture strength of a tool.
Figure 22B:
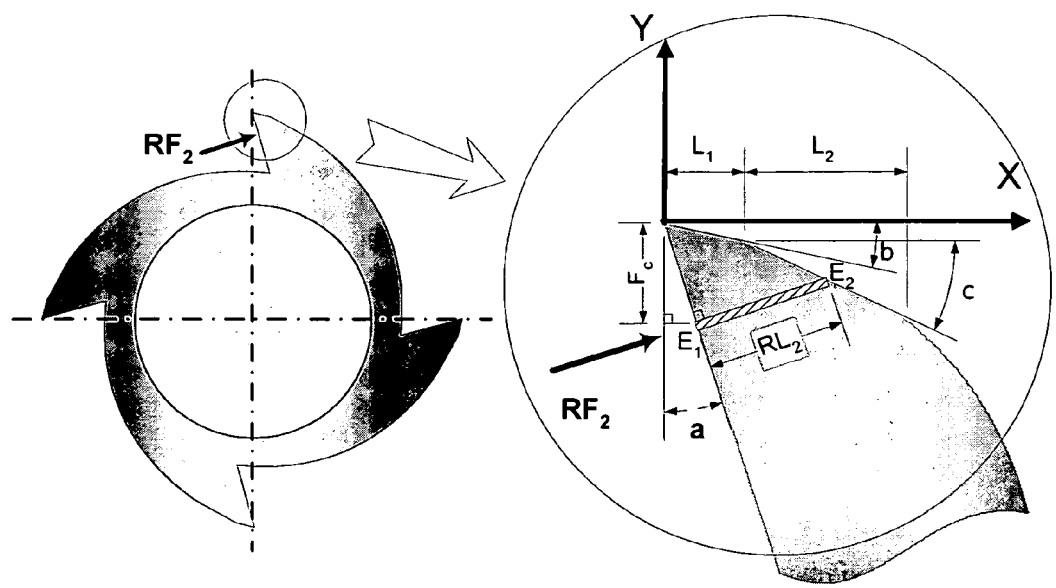

When cutting force is selected as a constraint variable, it is necessary to obtain an optimum feed rate for adjusting a maximum resultant force of the cutting force using the cutting force model. Two reference cutting forces as shown in Formula 45 below are considered using a tool transverse rupture strength presented by tool manufacturers.

$$RF_1 = SF \cdot TRS \cdot S_1$$

$$RF_2 = SF \cdot TRS \cdot S_2 \quad \text{[Formula 45]}$$

where $RF_1$ represents the reference cutting force considered to avoid breakage of the tool shank and $RF_2$ indicates the reference cutting force to prevent breakage of the tool edge. SF means safety factor, which is used to make up for unpredictable factors such as cutter geometry error or cutter material variation. TRS means transverse rupture strength of the tool material. $S_1$ is equivalent cross section area and $S_2$ is cross section area of the edge at the unit disk element. $S_1$ and $S_2$ are calculated as follows:

$$S_1 = \pi\left(\frac{RL_1}{2}\right)^2 \quad \text{[Formula 46]}$$

$$S_2 = RL_2 \cdot D_a$$

where $D_a$ indicates the height of unit disk. $RL_1$ is the equivalent radius of the tool as shown in FIG. 22A; $RL_2$ indicates rupture length when the tool edge is broken in FIG. 22B; a, b, and c indicate rake angle, $1^{st}$ flank angle, and $2^{nd}$ flank angle, respectively; and $L_1$ and $L_2$ indicate the length of the $1^{st}$ flank plane and that of the $2^{nd}$ flank plane, respectively. $F_c$ is used to indicate the position where tool edge breakage occurs.

$RL_2$ indicates the distance between $E_1(x_1,y_1)$ and $E_2(x_2, y_2)$. $E_1$ is calculated as $(F_c \cdot \tan a, -F_c)$ and $E_2$ is determined as the intersection point between $RL_2$ and the $1^{st}$ flank plane or between $RL_2$ and the $2^{nd}$ flank plane.

If $RL_2$ meets the $1^{st}$ flank plane, that is, $$\frac{L_1 \tan a(\tan a + \tan b)}{(\tan^2 a + 1)} < F_c \cdot \tan a,$$

$E_2$ can be calculated as follows:

$$E_2 = \left(\frac{F_c(1 + \tan^2 a)}{(\tan a + \tan b)}, -\tan b, x_1\right) \quad \text{[Formula 47]}$$

If $RL_2$ meets the $2^{st}$ flank plane, that is, $$\frac{L_1 \tan a(\tan a + \tan b)}{(\tan^2 a + 1)} > F_c \cdot \tan a,$$

$E_2$ can be calculated as follows:

$$E_2 = \left(\frac{1}{(\tan a + \tan c)} \cdot (L_1(\tan c - \tan b) + F_c(1 + \tan^2 a)), \right. \quad \text{[Formula 48]}$$
$$\left. -x_2 \cdot \tan c + L_1(\tan c - \tan b)\right)$$

Since the reference cutting force is given as the resultant cutting force in the XY plane, $RF_2$, the normal force on the rake force should be transformed as follows:

$$RF_2' = N_d \cdot R_1 \cdot \sqrt{(1+B_1^2)} \quad \text{[Formula 49]}$$

where $B_1$ is the parameter of $K_f$ used in Formula 30, and $N_d$ means the number of disk elements engaged in a workpiece.

Finally, the minimum value between $RF_1$ and $RF_2'$ is selected as a reference cutting force as follows:

$$\text{Reference cutting force} = \text{Min}(RF_1, RF_2') \quad \text{[Formula 50]}$$

If the reference cutting force is determined using such a method, a feed rate that satisfies the reference cutting force can be obtained using a feed rate scheduling method based on the cutting force model.

In the case where surface errors are selected as the constraint variable, the optimum feed rate for adjusting a maximum value of surface errors can be obtained using the machined surface error model. The feed rate that satisfies the given allowable error is calculated from the machined surface error model.

[Feed Rate Scheduling Algorithm]

Figure 23:
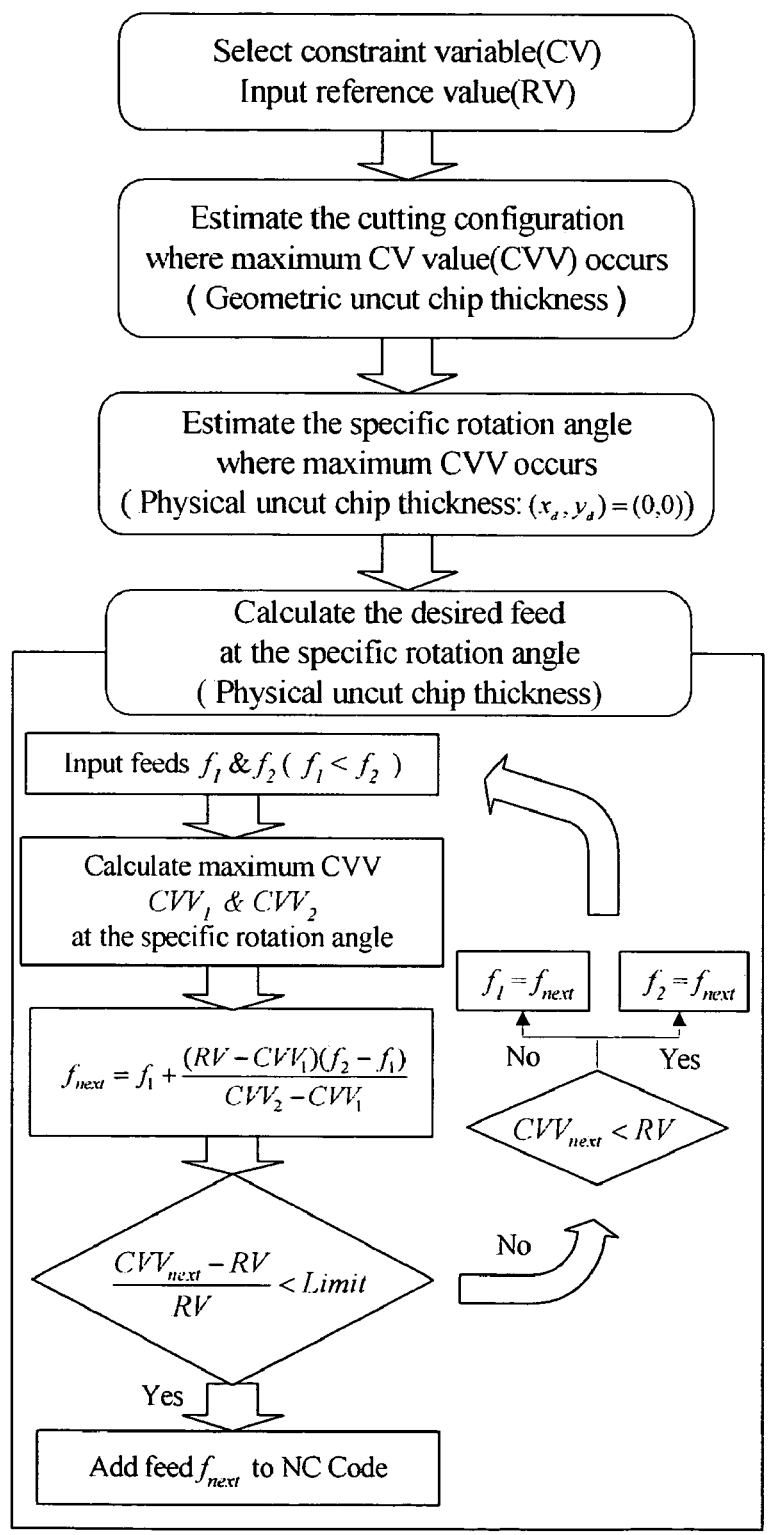
FIG. 23 is a flow chart of an algorithm used to calculate a feed rate that satisfies a reference value in order to adjust a constraint variable in an NC code interval.

FIG. 23 is a flow chart of an algorithm used to calculate a feed rate that satisfies a reference value in order to adjust a constraint variable (cutting force or machined surface error) in the given simulation interval. The cutting force model and the machined surface error model are used to calculate constraint variable values. The algorithm appearing in FIG. 23 can be used for regulation of cutting force and machined surface error.

In the present invention, there is proposed a simulation time reduction method for feed rate scheduling. This algorithm first determines a position of a tool path that generates a maximum value of a constraint variable (cutting force/surface error) during one rotation in the given simulation interval, then provides a maximum feed rate at that position for adjusting a maximum constraint variable value as a standard value. When the constraint variable value is estimated, it takes a significant amount of time to calculate tool deflection always from 0 degrees to 360 degrees. To prevent an increase in the simulation time occurring as the calculation is repeated, feed rate scheduling is performed only at a position of a specific tool path.

The actual uncut chip thickness in the cutting force model and the surface error model of the present invention is calculated considering tool deflection and run out, and positions passed by previous edges. Although this method increases the precision in estimating cutting force and surface error, since it uses an algorithm that repeats computations to converge on a correct solution when calculating tool deflection, the time required for calculation is increased. Accordingly, when estimating a position where a maximum value of a constraint variable in a tool path occurs and a position angle where a maximum value of a constraint variable in one rotation occurs, a geometric uncut chip thickness is calculated as shown in Formulae 10 and 32. As shown in FIG. 23, if the user sets a specific simulation time interval when performing feed rate scheduling, a constraint variable value is estimated along a tool path in the given simulation time interval using Formula 10 or Formula 32, which are geometric uncut chip thickness model formulae, and after the location at which the maximum value of the constraint variable occurs is determined, the position angle where the maximum value of the constraint occurs is determined at that location. Subsequently, simulation is performed at only the position angle where the maximum constraint variable value occurs using Formula 12 or Formula 34, to quickly obtain a feed rate that satisfied a reference value.

The maximum value of the constraint variable has a tendency to increase as a feed rate increases in the given axial depth of cut and cutting speed. Using this relation, a feed rate corresponding to a reference cutting force can be obtained through a linear search. With reference to FIG. 23, when maximum constraint variable values of specific feed rates $f_1$ and $f_2$ are $CVV_1$ and $CVV_2$, the feed rate of $f_{next}$ corresponding to the reference value RV, can be approximated using Formula 51 below.

$$f_{next} = f_1 + \frac{(RV - CVV_1)(f_2 - f_1)}{CVV_2 - CVV_1} \quad \text{[Formula 51]}$$

With reference to FIG. 23, in the case where the constraint variable calculated from $f_{next}$ is different from the reference value, the process is repeated whereby whichever of $f_1$ and $f_2$ that is closer to $f_{next}$ is designated as the new $f_1$, and $f_{next}$ is substituted for $f_2$, then the process for obtaining a new $f_{next}$ is repeated.

That is, following calculation of a constraint variable $CVV_{next}$ of when the feed rate is $f_{next}$, it is determined using Formula 52 below if the constraint variable value $CVV_{next}$ when compared to the reference value RV is less than the error limit. When it is less than the error limit, the feed rate $f_{next}$ is applied to the NC code. However, when this value is not less than the error limit and the reference value RV is greater than the constraint variable value $CVV_{next}$, the feed rate $f_2$ is replaced by $f_{next}$. Further, when this value is not less than the error limit and the reference value is not greater than the constraint variable value $CVV_{next}$, the feed rate $f_1$ is replaced by $f_{next}$, then the process of obtaining $f_{next}$ is repeated.

$$\frac{CVV_{next} - RV}{RV} < \text{Error Limit} \quad \text{[Formula 52]}$$

Since the feed rate is a natural number, an optimum feed rate can be quickly obtained through such a method.

Figure 24:
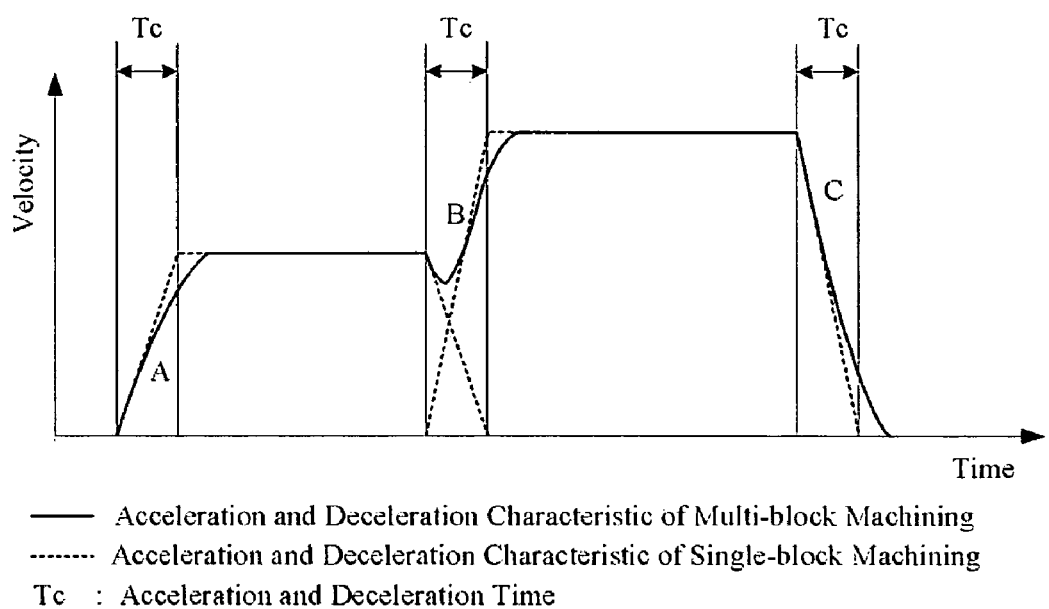
FIG. 24 is a graph showing acceleration and deceleration characteristics of a machine tool.

Automatic acceleration and deceleration by a controller is realized in exponential function form in an A, C interval as shown in FIG. 24. Accordingly, the time it takes to reach a designated feed rate after each block starts is slightly greater than a designated acceleration and deceleration time $T_c$. In all blocks of an NC code, an acceleration and deceleration time of approximately $T_c$ is required to reach a desired feed rate during machining. In manufacturing machines that are being developed in recent times, a look-ahead algorithm is applied to somewhat overcome this problem related to acceleration and deceleration. However, in manufacturing machines that do not have a look-ahead function, it is necessary to take into account such acceleration and deceleration characteristics during machining. Even when a look-ahead function is provided, the acceleration and deceleration characteristics cannot be completely ignored.

If a look-ahead function is not supported in a controller, it is not possible to obtain a desired feed rate in a block that is smaller than the acceleration and deceleration time of the manufacturing machine. Therefore, when the NC code is divided to optimize feed rate, it is necessary that the block size be greater than the acceleration and deceleration time. In order to perform machining of a block to a predetermined feed rate, the size of the block must be at least two to three times greater than the acceleration and deceleration time, and the greater the block size the longer the predetermined interval of the feed rate becomes. Accordingly, in the present invention, although an NC code block is divided when the amount of change in a constraint variable value surpasses a reference value, when the size of the divided block is smaller than a size determined by considering acceleration and deceleration, the NC code block is divided at the position where the block starts to be greater than the limited size.

In the off-line feed rate scheduling method of the present invention described above, a feed rate scheduling method is developed based on a cutting force model and a surface error model. Therefore, machining precision and productivity can be improved during CNC machining using the proposed feed rate scheduling model.

Although embodiments of the present invention have been described in detail hereinabove in connection with certain exemplary embodiments, it should be understood that the invention is not limited to the disclosed exemplary embodiments, but, on the contrary is intended to cover various modifications and/or equivalent arrangements included within the spirit and scope of the present invention, as defined in the appended claims.

What is claimed is:
1. An off-line feed rate scheduling method of a CNC machining process that is performed according to workpiece geometry and a given set of NC code provided from a CAD/CAM system, the method comprising:
  selecting a constraint variable and inputting a reference value related to the constraint variable;
  estimating a cutting configuration where a maximum constraint variable value (CW) occurs through ME Z-map modeling;
  obtaining the estimated cutting configuration and estimating a specific rotation angle ($\phi_s$) where the maximum constraint variable value occurs through constraint variable modeling;
  calculating a feed rate that satisfies the reference value related to the constraint variable at the estimated specific rotation angle; and
  applying the calculated feed rate to the NC code,
  wherein the calculating a feed rate comprises:
  inputting specific feed rates $f_1$ and $f_2$ ($f_1 < f_2$);
  calculating maximum constraint variable values $CVV_1$ and $CVV_2$ corresponding to the feed rates $f_1$ and $f_2$, respectively, at the specific rotation angle;
  approximating a feed rate $f_{next}$ that corresponds to a reference value RV of a constraint variable value using the formula,

$$f_{next} = f_1 + \frac{(RV - CVV_1)(f_2 - f_1)}{CVV_2 - CVV_1};$$

calculating a constraint variable $CVV_{next}$ in the case where the feed rate is $f_{next}$; and
  determining using the formula below if the constraint variable value $CVV_{next}$ when compared to the reference value RV is less than an error limit, applying the feed rate $f_{next}$ to the NC code when it is less than the error limit, replacing the feed rate $f_2$ by $f_{next}$ and repeating the process of obtaining $f_{next}$ when this value is not less than the error limit and the reference value RV is greater than the constraint variable value $CVV_{next}$, and replacing the feed rate $f_1$ by $f_{next}$ and repeating the process of obtaining $f_{next}$ when this value is not less than the error limit and the reference value is not greater than the constraint variable value $CVV_{next}$, where $$\frac{CVV_{next} - RV}{RV} < \text{Error Limit}.$$

2. The method of claim 1, wherein computing cutting configurations through ME Z-map modeling comprises:
  searching for node points located in a cutting area;
  identifying whether a target node is an edge node or not;
  calculating and updating a height value of each node in the cutting area;
  moving a target node if it is an edge node and storing movement direction angles;
  computing the cutting configurations using the stored angles.

3. The method of claim 2, wherein the cutting configurations computed through ME Z-map modeling include at least one of an entry angle, an exit angle, and an axial depth of cut.

4. The method of claim 2, wherein in the case where a difference between a distance from a tool center to a target node and a tool radius is smaller than a movement limit, this node is designated as an edge node.

5. The method of claim 1, wherein one of cutting force and machined surface error is selected as a constraint variable.

6. An off-line feed rate scheduling method for adjusting a cutting force of a CNC machining process that is performed according to workpiece geometry and a given set of NC code instructing paths of a tool provided from a CAD/CAM system, the method comprising:
  inputting a reference cutting force;
  estimating a cutting configuration where a maximum cutting force occurs through ME Z-map modeling;
  receiving the estimated cutting configuration and estimating a specific rotation angle where the maximum cutting force occurs through cutting force modeling;
  calculating a feed rate that satisfies the reference cutting force at the estimated specific rotation angle; and
  applying the calculated feed rate to the NC code.

7. The method of claim 6, wherein the reference cutting force is selected from a reference cutting force $RF_1$ established to prevent breaking of a tool shank, and a reference cutting force $RF_2$ established to prevent damage to an edge portion of a tool, $RF_1$ and RF2 being calculated by the formulae $$RF_1 = SF \cdot TRS \cdot S_1$$

$$RF_2 = SF \cdot TRS \cdot S_2$$

where $RF_1$ represents the reference cutting force considered to avoid breakage of tool shank and $RF_2$ indicates the reference cutting force to prevent breakage of tool edge; SF means safety factor, which is used to make up for unpredictable factors; and TRS means transverse rupture strength of a tool material.

8. The method of claim 6, wherein the tool is a flat end milling tool, and cutting force components of each axial direction of three-dimensional Cartesian coordinate according to a rotational angle of the tool are obtained using $$F_x(j) = \sum_k \sum_i F_x(i, j, k)$$

$$F_y(j) = \sum_k \sum_i F_y(i, j, k)$$

$$F_z(j) = \sum_k \sum_i F_z(i, j, k)$$

where $$F_x(i,j,k) = [C_1 K_n \cos(\phi - \alpha_r) \times K_f K_n C_3 \cos \phi - K_f K_n C_4 \sin(\phi - \alpha_r)] t_c(\phi) B_1$$

$$F_y(i,j,k) = [C_1 K_n \sin(\phi - \alpha r) K_f K_n C_3 \sin \phi \times K_f K_n C_4 \cos(\phi - \alpha_r)] t_c(\phi) B_1$$

$$F_z(i,j,k) = [-C_2 K_n + K_f K_n C_5] t_c(\phi) B_1$$

and where $C_1$, $C_2$, $C_3$, $C_4$, and $C_5$ in the above are calculated by the following:

$$C_1 = \frac{\cos\theta_h}{\sin\theta_{tk}}, \quad C_2 = \frac{\sin\theta_h}{\sin\theta_{tk}} \cdot \cos\alpha_r$$

$$C_3 = \sin\theta_h(\sin\theta_c - \cos\theta_c \cot\theta_{tk})$$

$$C_4 = \frac{\cos\theta_c}{\sin\theta_{tk}}$$

$$C_5 = \cos\theta_h(\sin\theta_c - \cos\theta_c \cot\theta_{tk})$$

and $$\cos\theta_{th} = \sin\alpha_r \cdot \sin\theta_h,$$

where i is a cutter tooth index, j is an index of a cutter rotation angle, k is an index of a z-axis disk element, $\phi$ is an angle position of a cutter edge, $\alpha_r$ is a rake angle, $t_c(\phi)$ is uncut chip thickness, $\theta_h$ is a helix angle, $\theta_c$ is a chip flow angle, and $K_n$, $K_f$ and $B_1$ are constants.

9. The method of claim 8, wherein $K_n$, $K_f$ and $\theta_c$ may be obtained by the following formulae, $$\ln(K_n(i,j,k)) = A_1 - (A_1 - A_2)e^{-(A_3 t_c(i,j,k))^{A_4}}$$

$$K_f(i,j,k) = B_1 - (B_1 - B_2)e^{-(B_3 t_c(i,j,k))^{B_4}}$$

$$\theta_c(i,j,k) = C_1 - (C_1 - C_2)e^{-(C_3 t_c(i,j,k))^{C_4}}$$

where $t_c$ is an actual uncut chip thickness, and $A_1$, $A_2$, $A_3$, $A_4$, $B_1$, $B_2$, $B_3$, $B_4$, $C_1$, $C_2$, $C_3$, and $C_4$ are constants.

10. The method of claim 6, wherein the tool is a ball end milling tool, and cutting force components of each axial direction of three-dimensional Cartesian coordinate according to a rotational angle of the tool are obtained using $$\begin{Bmatrix} F_x \\ F_y \\ F_z \end{Bmatrix} = \begin{bmatrix} A_{11} & A_{12} & A_{13} \\ A_{21} & A_{22} & A_{23} \\ A_{31} & A_{32} & A_{33} \end{bmatrix} \begin{Bmatrix} K_1 \\ K_2 \\ K_3 \end{Bmatrix}$$

where $$K_1 = K_n$$

$$K_2 = \cos\theta_c K_n K_f$$

$$K_3 = \sin\theta_c K_n K_f$$

$$A_{11} = B_1 \sum_k \sum_i (\cos\alpha_r \cos\phi \cos\theta_h + \sin\alpha_r \sin\phi) \cdot t_c(\phi)$$

$$A_{12} = B_1 \sum_k \sum_i \left(\sin\alpha_r \frac{1}{f_2}\cos\phi\cos\theta_h - \frac{1}{f_2}\cos\alpha_r\sin\phi - \frac{f_1}{f_2}\cos\alpha_r\cos\phi\sin\theta_h\right) \cdot t_c(\phi)$$

$$A_{13} = B_1 \sum_k \sum_i \left(-\frac{f_1}{f_2}\sin\phi + \frac{1}{f_2}\cos\phi\sin\theta_h\right) \cdot t_c(\phi)$$

$$A_{21} = B_1 \sum_k \sum_i (\cos\alpha_r\sin\phi\cos\theta_h - \sin\alpha_r\cos\phi) \cdot t_c(\phi)$$

$$A_{22} = B_1 \sum_k \sum_i \left(\sin\alpha_r\frac{1}{f_2}\sin\phi\cos\theta_h + \frac{1}{f_2}\cos\alpha_r\cos\phi - \frac{f_1}{f_2}\cos\alpha_r\sin\phi\sin\theta_h\right) \cdot t_c(\phi)$$

$$A_{23} = B_1 \sum_k \sum_i \left(\frac{f_1}{f_2}\cos\phi + \frac{1}{f_2}\sin\phi\sin\theta_h\right) \cdot t_c(\phi)$$

$$A_{31} = B_1 \sum_k \sum_i (-\sin\theta_h\cos\alpha_r) \cdot t_c(\phi)$$

$$A_{32} = B_1 \sum_k \sum_i \left(-\sin\alpha_r\frac{1}{f_2}\sin\theta_h - \frac{f_1}{f_2}\cos\alpha_r\cos\theta_h\right) \cdot t_c(\phi)$$

where i is a cutter tooth index, j is an index of a cutter rotation angle, k is an index of a z-axis disk element, $\phi$ is an angle position of a cutter edge, $\alpha_r$ is a rake angle, $t_c(\phi)$ is uncut chip thickness, $\theta_h$ is a helix angle, $\theta_c$ is a chip flow angle, and $K_n$, $K_f$, $B_1$, $f_1$ and $f_2$ are constants.

11. The method of claim 10, wherein $K_n$, $K_f$ and $\theta_c$ may be obtained by the following formulae:

$$K_n = K_1$$

$$\theta_c = \tan^{-1}\left(\frac{K_3}{K_2}\right)$$

$$K_f = \frac{K_2}{\cos\theta_c K_n},$$

where $K_1$, $K_2$ and $K_3$ are constants.

12. An off-line feed rate scheduling method for adjusting a machined surface error of a CNC machining process that is performed according to workpiece geometry and a given set of NC code instructing paths of a tool provided from a CAD/CAM system, the method comprising:
inputting a reference surface error;
estimating a cutting configuration where a maximum surface error occurs through ME Z-map modeling;
receiving the estimated cutting configuration and estimating a specific rotation angle where the maximum surface error occurs through machined surface error modeling;
calculating a feed rate that satisfies the reference surface error at the estimated specific rotation angle; and
applying the calculated feed rate to the NC code,
wherein the tool is a flat end milling tool, and a cusp error $C_h$ is calculated using the formula $$C_h = R - \sqrt{R^2 - \left(\frac{f_t}{2}\right)^2}$$

where R is a tool radius and $f_t$ is an edge feed rate.

13. An off-line feed rate scheduling method for adjusting a machined surface error of a CNC machining process that is performed according to workpiece geometry and a given set of NC code instructing paths of a tool provided from a CAD/CAM system, the method comprising:
inputting a reference surface error;
estimating a cutting configuration where a maximum surface error occurs through ME Z-map modeling;
receiving the estimated cutting configuration and estimating a specific rotation angle where the maximum surface error occurs through machined surface error modeling;
calculating a feed rate that satisfies the reference surface error at the estimated specific rotation angle; and
applying the calculated feed rate to the NC code,
wherein the tool is a ball end milling tool, and a cusp error $C_h$ is calculated using the formula, $$C_h = R - \sqrt{R^2 - \left(\frac{D}{2}\right)^2}$$

where $D = \sqrt{(TPD^2 + f_t^2)}$, TPD being an interval between a tool path, R being a tool radius and $f_t$ being an edge feed rate.

* * * * *